United States Patent
Shvachko et al.

(10) Patent No.: US 10,795,863 B2
(45) Date of Patent: Oct. 6, 2020

(54) GEOGRAPHICALLY-DISTRIBUTED FILE SYSTEM USING COORDINATED NAMESPACE REPLICATION OVER A WIDE AREA NETWORK

(71) Applicant: WANdisco, Inc., San Ramon, CA (US)

(72) Inventors: Konstantin V Shvachko, Fremont, CA (US); Yeturu Aahlad, Foster City, CA (US); Jagane Sundar, Saratoga, CA (US); Plamen Jeliazkov Jeliazkov, San Jose, CA (US)

(73) Assignee: WANdisco Inc., San Ramon, CA (US)

( * ) Notice: Subject to any disclaimer, the term of this patent is extended or adjusted under 35 U.S.C. 154(b) by 0 days.

(21) Appl. No.: 15/276,455

(22) Filed: Sep. 26, 2016

(65) Prior Publication Data
US 2017/0193002 A1 Jul. 6, 2017

Related U.S. Application Data

(63) Continuation of application No. 14/231,311, filed on Mar. 31, 2014, now Pat. No. 9,495,381.

(51) Int. Cl.
*G06F 16/178* (2019.01)
*G06F 16/182* (2019.01)
*H04L 29/08* (2006.01)

(52) U.S. Cl.
CPC .......... *G06F 16/178* (2019.01); *G06F 16/182* (2019.01); *G06F 16/1844* (2019.01); *H04L 67/1095* (2013.01)

(58) Field of Classification Search
CPC . G06F 17/30197; G06F 16/178; G06F 16/182
See application file for complete search history.

(56) References Cited

U.S. PATENT DOCUMENTS 5,261,085 A 11/1993 Lamport
5,699,515 A 12/1997 Berkema et al.
(Continued)

FOREIGN PATENT DOCUMENTS

| CN | 102999633 A | 3/2013 |
|---|---|---|
| CN | 103458044 A | 12/2013 |
| CN | 103458044 A1 | 12/2013 |

OTHER PUBLICATIONS

Wiki Amazon S3, downloaded from http://en.wikipedia.org/wiki/Amazon_S3 on Mar. 4, 2014.
(Continued)

*Primary Examiner* — Mohammad S Rostami
(74) *Attorney, Agent, or Firm* — Young Law Firm, P.C.

(57) ABSTRACT

A cluster of nodes implements a single distributed file system comprises at least first and second data centers and a coordination engine process. The first data center may comprise first DataNodes configured to store data blocks of client files, and first NameNodes configured to update a state of a namespace of the cluster. The second data center, geographically remote from and coupled to the first data center by a wide area network, may comprise second DataNodes configured to store data blocks of client files, and second NameNodes configured to update the state of the namespace. The first and second NameNodes are configured to update the state of the namespace responsive to data blocks being written to the DataNodes. The coordination engine process spans the first and second NameNodes and coordinates updates to the namespace stored such that the state thereof is maintained consistent across the first and second data centers.

20 Claims, 5 Drawing Sheets

(56) References Cited

U.S. PATENT DOCUMENTS

| | | |
|---|---|---|
| 5,737,601 A | 4/1998 | Jain et al. |
| 5,781,910 A | 7/1998 | Gostanian et al. |
| 6,014,669 A | 1/2000 | Slaughter et al. |
| 6,161,146 A | 12/2000 | Kley et al. |
| 6,202,067 B1 | 3/2001 | Blood et al. |
| 6,247,059 B1 | 6/2001 | Johnson |
| 6,261,085 B1 | 7/2001 | Steger et al. |
| 6,360,366 B1 | 3/2002 | Heath et al. |
| 6,401,120 B1 | 6/2002 | Gamache et al. |
| 6,898,642 B2 | 5/2005 | Chafle et al. |
| 7,069,320 B1 | 6/2006 | Chang |
| 7,155,524 B1 | 12/2006 | Reiter et al. |
| 7,167,900 B2 | 1/2007 | Berkowitz et al. |
| 7,185,076 B1 | 2/2007 | Novaes |
| 7,334,154 B2 | 2/2008 | Lorch et al. |
| 7,400,596 B1 | 6/2008 | Robertson et al. |
| 7,558,883 B1 | 7/2009 | Lamport |
| 7,765,186 B1 | 7/2010 | Hu et al. |
| 7,788,522 B1 | 8/2010 | Abdelaziz |
| 8,180,747 B2 | 5/2012 | Marinkovic |
| 8,732,648 B2 | 5/2014 | Suaya |
| 8,818,951 B1 | 8/2014 | Muntz |
| 9,009,215 B2 | 4/2015 | Aahlad et al. |
| 9,020,987 B1 | 4/2015 | Nanda |
| 9,130,943 B1 | 9/2015 | Giardina |
| 9,158,843 B1* | 10/2015 | Florissi ............... H04L 67/1097 |
| 2002/0129087 A1 | 9/2002 | Cachin et al. |
| 2003/0131262 A1 | 7/2003 | Goddard |
| 2003/0145020 A1 | 7/2003 | Ngo et al. |
| 2004/0034822 A1 | 2/2004 | Marchand |
| 2004/0098447 A1* | 5/2004 | Verbeke ............... G06F 9/5055 |
| | | 709/201 |
| 2004/0111441 A1 | 6/2004 | Saito |
| 2004/0148326 A1* | 7/2004 | Nadgir ................. G06F 9/5072 |
| | | 709/200 |
| 2004/0162871 A1* | 8/2004 | Pabla ................... H04W 8/005 |
| | | 709/201 |
| 2004/0172421 A1 | 9/2004 | Saito |
| 2004/0221149 A1 | 11/2004 | Rao et al. |
| 2005/0086384 A1* | 4/2005 | Ernst ...................... G06F 17/30 |
| | | 709/248 |
| 2005/0198493 A1 | 9/2005 | Bartas |
| 2005/0253644 A1 | 12/2005 | Lorch et al. |
| 2006/0013252 A1 | 1/2006 | Smith |
| 2006/0143517 A1 | 7/2006 | Douceur et al. |
| 2006/0155720 A1 | 7/2006 | Aahlad et al. |
| 2006/0155729 A1 | 7/2006 | Aahlad et al. |
| 2006/0203837 A1 | 9/2006 | Shvodian |
| 2006/0235889 A1 | 10/2006 | Rousseau et al. |
| 2006/0253856 A1 | 11/2006 | Hu |
| 2006/0259818 A1 | 11/2006 | Howell et al. |
| 2006/0265508 A1* | 11/2006 | Angel ............... H04L 29/12047 |
| | | 709/230 |
| 2007/0189249 A1 | 8/2007 | Gurevich |
| 2007/0204078 A1 | 8/2007 | Boccon-Gibod |
| 2008/0036472 A1 | 2/2008 | Collins et al. |
| 2008/0133741 A1 | 6/2008 | Kubota |
| 2008/0134052 A1 | 6/2008 | Davis et al. |
| 2009/0150566 A1 | 6/2009 | Malkhi et al. |
| 2009/0210431 A1 | 8/2009 | Marinkovic |
| 2009/0271412 A1* | 10/2009 | Lacapra ............ G06F 17/30206 |
| 2010/0153282 A1 | 6/2010 | Graham |
| 2010/0018014 A1 | 7/2010 | Rousseau et al. |
| 2010/0180146 A1 | 7/2010 | Rousseau et al. |
| 2010/0188969 A1 | 7/2010 | Kim |
| 2010/0192160 A1 | 7/2010 | Taylor et al. |
| 2010/0333166 A1 | 12/2010 | Herrod |
| 2011/0066296 A1 | 3/2011 | Nelson |
| 2011/0072062 A1 | 3/2011 | Guarraci |
| 2011/0107358 A1 | 5/2011 | Shyam |
| 2011/0276538 A1* | 11/2011 | Knapp ................. G06F 11/1446 |
| | | 707/626 |
| 2011/0302449 A1 | 12/2011 | Douceur et al. |
| 2011/0314163 A1 | 12/2011 | Borins |
| 2012/0101991 A1* | 4/2012 | Srivas ............... G06F 17/30194 |
| | | 707/623 |
| 2012/0197958 A1 | 8/2012 | Nightingale |
| 2012/0204139 A1 | 8/2012 | Suaya et al. |
| 2012/0254111 A1* | 10/2012 | Carmichael ......... H04L 43/0876 |
| | | 707/627 |
| 2012/0254412 A1 | 10/2012 | Goose et al. |
| 2012/0310892 A1* | 12/2012 | Dam .................... G06F 11/2094 |
| | | 707/659 |
| 2012/0311003 A1* | 12/2012 | Kuznetsov ............ G06F 16/176 |
| | | 707/827 |
| 2013/0041872 A1* | 2/2013 | Aizman ................ G06F 16/182 |
| | | 707/690 |
| 2013/0151884 A1* | 6/2013 | Hsu ..................... G06F 16/1827 |
| | | 714/4.11 |
| 2013/0198332 A1 | 8/2013 | Van Ackere |
| 2013/0325814 A1* | 12/2013 | Carter .................. G06F 16/113 |
| | | 707/661 |
| 2014/0019495 A1* | 1/2014 | Borthakur ......... G06F 17/30203 |
| | | 707/827 |
| 2014/0040182 A1* | 2/2014 | Gilder ................. G06F 17/2264 |
| | | 707/602 |
| 2014/0059310 A1* | 2/2014 | Du .......................... G06F 3/065 |
| | | 711/162 |
| 2014/0074996 A1 | 3/2014 | Bortnikov et al. |
| 2014/0081927 A1* | 3/2014 | Lipcon ............... G06F 11/2028 |
| | | 707/692 |
| 2014/0082145 A1* | 3/2014 | Lacapra ............. H04L 67/1097 |
| | | 709/219 |
| 2014/0164262 A1 | 6/2014 | Graham |
| 2014/0181262 A1 | 6/2014 | Goswami et al. |
| 2014/0250073 A1* | 9/2014 | Zalpuri ................ G06F 16/273 |
| | | 707/636 |
| 2014/0330787 A1* | 11/2014 | Modukuri ............... G06F 11/20 |
| | | 707/659 |
| 2014/0344323 A1 | 11/2014 | Pelavin |
| 2015/0249647 A1* | 9/2015 | Mityagin .............. G06F 16/178 |
| | | 713/168 |
| 2018/0081927 A1 | 3/2018 | Soryal et al. |

OTHER PUBLICATIONS

Introducing Geo-replication for Windows Azure Storage, Sep. 15, 2011 1:27 PM, downloaded from http://blogs.msdn.com/b/windowsazurestorage/archive/2011/09/15/introducing-geo-replication-for-windows-azure-storage.aspx on Mar. 4, 2014.

Google Cloud Storage Overview, downloaded from https://developers.google.com/storage/docs/overview on Mar. 4, 2014.

Cloudera Backup and Disaster Recovery, downloaded from https://www.cloudera.com/content/cloudera-content/cloudera-docs/CM4Ent/latest/Cloudera-Backup-Disaster-Recovery/Cloudera-Backup-Data-Recovery.html on Mar. 4, 2014.

What is Hadoop? » Apache Falcon Apache Falcon A framework for managing data processing in Hadoop Clusters, downloaded from http://hortonworks.com/hadoop/falcon/ on Mar. 4, 2014.

MapR Disaster Recovery Scenario Data+Protection, Peter Conrad, last edited by Anne Leeper on Feb 22, 2014, downloaded from http://doc.mapr.com/display/MapR/Data+Protection#DataProtection-DisasterRecoveryScenario: DisasterRecovery on Mar. 4, 2014.

Hadoop HDFS HDFS-5442 Zero loss HDFS data replication for multiple datacenters, The Apache Software Foundation, Created: Oct. 29, 2013 13:11 Updated:Jan. 14, 2010 08:13, doownloaded from https://issues.apache.org/jira/browse/HDFS-5442 on Mar. 4, 2014.

Disaster Recovery Solution for Apache Hadoop Contributors: Chen Haifeng (haifeng.chen@intel.com), Gangumalla Uma (uma.gangumalla@intel.com), Dey Avik (avik.dey@intel.com), Li Tianyou (tianyou.li@intel.com), Purtell, Andrew (andrew.k.purtell@intel.com), downlaoded from https://issues.apache.org/jira/secure/attachment/12620116/Disaster% 20Recovery%20Solution%20for%20Hadoop.pdf on Mar. 4, 2014.

Spanner: Google's Globally-Distributed Database, James C. Corbett, Jeffrey Dean, Michael Epstein, Andrew Fikes, Christopher Frost, JJ Furman, Sanjay Ghemawat, Andrey Gubarev, Christopher Heiser,

(56) References Cited

OTHER PUBLICATIONS

Peter Hochschild, Wilson Hsieh, Sebastian Kanthak, Eugene Kogan, Hongyi Li, Alexander Lloyd, Sergey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford, downloaded from http://research.google.com/archive/spanner.html on Mar. 4, 2014.
Transactional storage for geo-replicated systems Yair Sovran, Russell Power, Marcos K. Aguilera, Jinyang Li, downloaded from http://research.microsoft.com/en-us/people/aguilera/walter-sosp2011.pdf on Mar. 4, 2014.
Stronger Semantics for Low-Latency Geo-Replicated Storage, Wyatt Lloyd, Michael J. Freedman, Michael Kaminsky, and David G. Andersen, To appear in Proceedings of the 10th USENIX Symposium on Networked Systems Design and Implementation (NSDI'13), Lombard, IL, Apr. 2013, downlaoded from http://sns.cs.princeton.edu/docs/eiger-nsdi13.pdf on Mar. 4, 2014.
CSPN: Cost-Effective Geo-Replicated Storage Spanning Multiple Cloud Services, Zhe Wu, Michael Butkiewicz, Dorian Perkins, Ethan Katz-Bassett, Harsha V. Madhyastha, downlaoded from http://conferences.sigcomm.org/sigcomm/2013/papers/sigcomm/p545.pdf on Mar. 4, 2014.
Implementing Fault-Tolerant Services Using the State Machine Approach; A Tutorial, Fred B. Schneider Department of Computer Science, Cornell University. Ithaca, New York 14583, ACM Computing Surveys, vol. 22, No. 4, Dec. 1990.
Specifying Systems, The TLA+ Language and Tools for Hardware and Software Engineers Leslie Lamport, Microsoft Research, First Printing, Version of Jun. 18, 2002, ISBN 0-321-14306-X.
The Part-Time Parliament, Leslie Lamport, ACM Transactions on Computer Systems 16, 2 (May 1998), 133-169.
Time, Clocks, and the Ordering of Events in a Distributed System, Leslie Lamport, Massachusetts Computer Associates, Inc., Communications of the ACM, Jul. 1978, vol. 21, No. 7.
Implementing Fault-Tolerant Services Using the State Machine Approach: A Tutorial, Fred B. Schneider Department of Computer Science, Cornell University. Ithaca, New York 14853, ACM Computing Surveys. vol. 22, No. 4, Dec. 1990.
Paxos Made Simple, Leslie Lamport, Nov. 1, 2001.
Oki et al. "Viewstamped Replication; A New Primary Copy Method to Support Highly-Available Distributed Systems", Technical Paper submitted at ACM Symposium . . . , 1996, pp. 8-17.
Bernstein et al., "Concurrency Control & Recovery in Database Systems", published by Addison Wesley, 1987, Chapters 6, 7 and 8.
Eli Collins, Todd Lipcon, Aaron T Myers, HDFS High Availability. Sanjay Radia, Rob Chansler, Suresh Srinivas, High Availability Framework for the HDFS Namenode.
Todd Lipcon, Quorum-Journal Design, Oct. 3, 2012.
USPTO Notice of Allowance dated Jun. 21, 2016 in U.S. Appl. No. 14/041,894.
USPTO Office Action dated Jul. 27, 2016 in U.S. Appl. No. 14/231,311.
Extended European Search Report dated Jul. 14, 2016 in EP application 13869434.4.
Extended European Search Report dated Jul. 7, 2016 in EP application 13867648.1.
USPTO Notice of Allowance dated Aug. 3, 2016 in U.S. Appl. No. 15/004,144.
Examination Report No. 1 for standard patent application dated Dec. 6, 2016 in AU patent application 2013368487.
Examination Report No. 1 for standard patent application dated Dec. 6, 2016 in AU patent application 2013368486.
USPTO Office Action dated Feb. 10, 2017 in U.S. Appl. No. 14/815,787.
USPTO Office Action dated Mar. 9, 2017 in U.S. Appl. No. 15/149,850.
Extended European Search Report in EP application 14769597.7, dated Nov. 16, 2016.
Examination report No. 1 for standard patent application in AU application 2013368486, dated Dec. 6, 2016.
Examination report No. 1 for standard patent application in AU application 2013368487, dated Dec. 6, 2016.
Konstantin Shvachko et al. "The Hadoop Distributed File System", Mass Storage Systems and Technologies (MSST), 2010 IEEE 26th Symposium on, IEEE, Piscataway, NJ, USA, May 3, 2010, pp. 1-10, XP031698650, ISBN 978-1-4244-7152-s.
Extended European Search Report dated Jul. 17, 2017 in EPO Application 15773935.0.
USPTO Office Action dated May 18, 2017 in U.S. Appl. No. 12/069,986.
International Search Report and Written Opinion in PCT/US13/63422, dated Apr. 21, 2014.
International Search Report and Written Opinion in PCT/US14/10451.
International Search Report and Written Opinion in PCT/US13/63454, dated Apr. 18, 2014.
Office Action dated Dec. 19, 2014 in U.S. Appl. No. 13/837,366.
Notice of Allowance dated Jan. 1, 2105 in U.S. Appl. No. 13/838,639.
USPTO Office Action dated Feb. 5, 2015 in related U.S. Appl. No. 13/835,888.
USPTO Office Action dated May 22, 2015 in related U.S. Appl. No. 14/013,948.
International Preliminary Report on Patentability dated Jul. 9, 2015 in PCT application PCT/US2013/063422.
International Preliminary Report on Patentability dated Jul. 9, 2015 in PCT application PCT/US2013/063454.
International Search Report and Written Opinion dated Jun. 25, 2015 in PCT application PCT/US2015/18680.
USPTO Notice of Allowance dated Jul. 30, 2015 in U.S. Appl. No. 14/464,030.
Spto Office Action dated Sep. 24, 2015 in U.S. Appl. No. 14/013,948.
Geo-replication, downloaded from http://searchwindowsserver.techtarget.com/definition/geo-replication on Mar. 4, 2014.
Amazon Simple Storage Service Developer Guide API Version Mar. 1, 2006, downloaded from http://awsdocs.s3.amazonaws.com/S3/latest/s3-dg.pdf on Mar. 4, 2014
USPTO Office Action dated Sep. 15, 2016 in U.S. Appl. No. 12/069,986.
Canadian Patent Office Office Action dated Jan. 15, 2018 in Canadian patent application 2,922,665.
European Patent Office Communication pursuant to Article 94(3) EPC dated Jan. 25, 2018 in EPO patent application serial No. 13867648.1.
USPTO Office Action dated Jan. 26, 2018 in U.S. Appl. No. 15/071,447.
CIPO Office Action dated Dec. 11, 2018 in Canadian Patent Application 2,938,768.
Communication pursuant to Article 94(3) EPC dated Nov. 19 2019 in EPO application 15773935.0.
Summons to attend oral proceedings pursuant to Rule 115(1) EPC dated Jul. 6, 2020 in EP Appln 15773935.0.
Bing Li et al: "Distributed metadata management scheme in cloud computing", Pervasive Computing and Applications (ICPCA), 2011 6th International Conference ON, IEEE, Oct. 26, 2011 (Oct. 26, 2011), pp. 32-38, XP032076065, DOI: 10.1109/ICPCA.2011.6106475 ISBN: 978-1-4577-0209-9.
Dhruba Borthakur et al: "Apache hadoop goes realtime at Facebook", Proceedings of the 2011 ACM Sigmod International Conference on Management of Data; Jun. 12-16, 2011; Athens, Greece, ACM, New York, NY, USA, Jun. 12, 2011 (Jun. 12, 2011), pp. 1071-1080, XP058003207, DOI: 10.1145/1989323.1989438 ISBN: 978-1-4503-0661-4.

\* cited by examiner

GEOGRAPHICALLY-DISTRIBUTED FILE SYSTEM USING COORDINATED NAMESPACE REPLICATION OVER A WIDE AREA NETWORK

CROSS-REFERENCE TO RELATED CASES

The present application is a Continuation of commonly assigned and co-pending U.S. patent application Ser. No. 14/231,311 filed on Mar. 31, 2014 and entitled "GEO-GRAPHICALLY-DISTRIBUTED FILE SYSTEM USING COORDINATED NAMESPACE REPLICATION OVER A WIDE AREA NETWORK", the disclosure of which is hereby incorporated by reference in its entirety.

BACKGROUND

The field of the embodiments disclosed herein includes distributed file systems. In particular, embodiments are drawn to a distributed file system (and the functionality enabled thereby) that uses geographically-distributed NameNodes and data nodes over a Wide Area Network (WAN) that may include, for example, the Internet.

DETAILED DESCRIPTION

The Hadoop Distributed File System (HDFS) namespace is a hierarchy of files and directories. Files and directories are represented on the NameNode by Modes. Modes record attributes like permissions, modification and access times, namespace and disk space quotas. The file content is split into large data blocks (typically 128 MB), and each data block of the file is independently replicated at multiple DataNodes (typically three). The NameNode is the metadata service of HDFS, which is responsible for namespace operations. The NameNode maintains the namespace tree and the mapping of blocks to DataNodes. That is, the NameNode tracks the location of data within a Hadoop cluster and coordinates client access thereto. Conventionally, each cluster has a single NameNode. The cluster can have thousands of DataNodes and tens of thousands of HDFS clients per cluster, as each DataNode may execute multiple application tasks concurrently. The Modes and the list of data blocks that define the metadata of the name system are called the image. NameNode keeps the entire namespace image in RAM. The persistent record of the image is stored in the NameNode's local native filesystem as a checkpoint plus a journal representing updates to the namespace carried out since the checkpoint was made.

A distributed system is composed of different components called nodes. To maintain system consistency, it may become necessary to coordinate various distributed events between the nodes. The simplest way to coordinate a particular event that must be learned consistently by all nodes is to choose a designated single master and record that event on the master so that other nodes may learn of the event from the master. Although simple, this approach lacks reliability, as failure of the single master stalls the progress of the entire system. In recognition of this, and as shown in FIG. 1, conventional HDFS implementations use an Active NameNode 102 that is accessed during normal operations and a backup called the Standby NameNode 104 that is used as a failover in case of failure of the Active NameNode 102.

Figure 1:
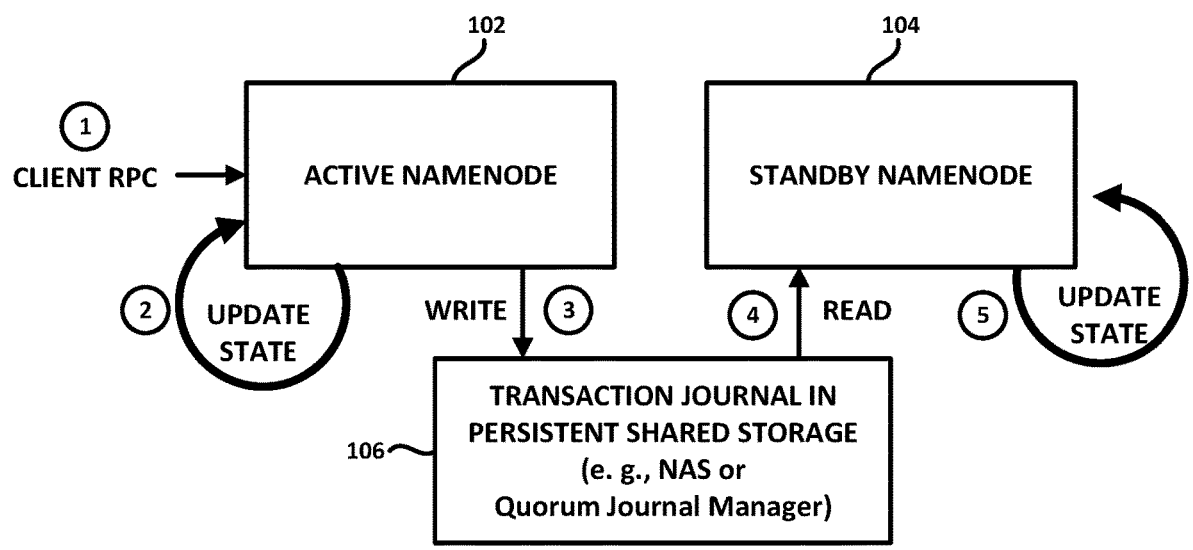
FIG. 1 is a diagram of a conventional HDFS implementation.

As shown in FIG. 1, a conventional HDFS cluster operates as follows. When an update to the namespace is requested, such when an HDFS client issues a remote procedure call (RPC) to, for example, create a file or a directory, the Active NameNode 102, as shown in FIG. 1:
1. receives the request (e.g., RPC) from a client;
2. immediately applies the update to its memory state;
3. writes the update as a journal transaction in shared persistent storage 106 (such as a Network Attached Storage (NAS) comprising one or more hard drives) and returns to the client a notification of success.

The Standby NameNode 104 must now update its own state to maintain coherency with the Active NameNode 102. Toward that end, the Standby NameNode 104
4. reads the journal transaction from the transaction journal 106, and
5. updates its own state This, however, is believed to be a sub-optimal solution. For example, in this scheme, the Transaction Journal 106 itself becomes the single point of failure. Indeed, upon corruption of the transaction journal 106, the Standby NameNode 104 can no longer assume the same state as the Active NameNode 102 and failover from the active to the Standby NameNode is no longer possible.

Moreover, in Hadoop solutions that support only one active NameNode per cluster, standby servers, as noted above, are typically kept in sync via Network Attached Storage (NAS) devices. If the active NameNode fails and the standby has to take over, there is a possibility of data loss if a change written to the Active NameNode has yet to be written to the NAS. Administrator error during failover can lead to further data loss. Moreover, if a network failure occurs in which the active server cannot communicate with the standby server but can communicate with the other machines in the cluster, and the standby server mistakenly assumes that the active server is dead and takes over the active role, then a pathological network condition known as a "split-brain" can occur, in which two nodes believe that they are the Active NameNode, which condition can lead to data corruption The roles of proposers (processes who make proposals to the membership), acceptors (processes who vote on whether a proposal should be agreed by the membership) and learners (processes in the membership who learn of agreements that have been made) are defined in, for example, the implementation of the Paxos algorithm described in Lamport, L.: The Part-Time Parliament, ACM Transactions on Computer Systems 16, 2 (May 1998), 133-169, which is incorporated herein in its entirety. According to one embodiment, multiple nodes may be configured each of the roles. A Coordination Engine (such as shown at 208 in FIG. 2) may allow multiple learners to agree on the order of events submitted to the engine by multiple proposers with the aid of multiple acceptors to achieve high availability. In order to achieve reliability, availability, and scalability, multiple simultaneously active NameNodes, according to one embodiment, may be provided by replicating the state of the namespace on multiple nodes with the requirement that the state of the nodes on which the namespace is replicated remains consistent between such nodes.

This consistency between NameNodes may be guaranteed by the Coordination Engine, which may be configured to accept proposals to update the namespace, streamline the proposals into a global sequence of updates and only then allow the NameNodes to learn and apply the updates to their individual states in the agreed-upon order. Herein, "consistency" means One-Copy Equivalence, as detailed in Bernstein et al., "Concurrency Control & Recovery in Database Systems", published by Addison Wesley, 1987, Chapters 6, 7 & 8, which is hereby incorporated herein in its entirety. Since the NameNodes start from the same state and apply the same deterministic updates in the same deterministic order, their respective states are and remain consistent.

According to one embodiment, therefore, the namespace may be replicated on multiple NameNodes, provided that
 a) each node is allowed to modify its namespace replica, and
 b) updates to one namespace replica must be propagated to the namespace replicas on other nodes such that the namespace replicas remain consistent with one another, across nodes.

I. Distributed File System on a Local Area Network (LAN)

One embodiment, therefore, eliminates the most problematic single point of failure impacting availability—the single NameNode. Conventionally, if the single NameNode becomes unavailable, the Hadoop cluster is down and complex failover procedures (such as switching from a previously Active NameNode to a Standby NameNode) are required to restore access. To address this potential single point of failure, one embodiment enables multiple active NameNode servers (herein variously denoted as ConsensusNode or CNodes) to act as peers, each continuously synchronized and simultaneously providing client access, including access for batch applications using MapReduce and real-time applications using HBase. According to one embodiment, when a NameNode server fails or is taken offline for maintenance or any other reason by a user, other peer active NameNode servers are always available, meaning there is no interruption in read and write access to the HDFS metadata. As soon as this server comes back online, its NameNode recovers automatically, is apprised of any new changes to the namespace that may have occurred in the interim and synchronizes its namespace to match the namespace of all of other NameNodes on the cluster. It will be consistent with the other replicas as it learns of the changes in the same deterministic order as the other nodes learnt of the changes.

Figure 2:
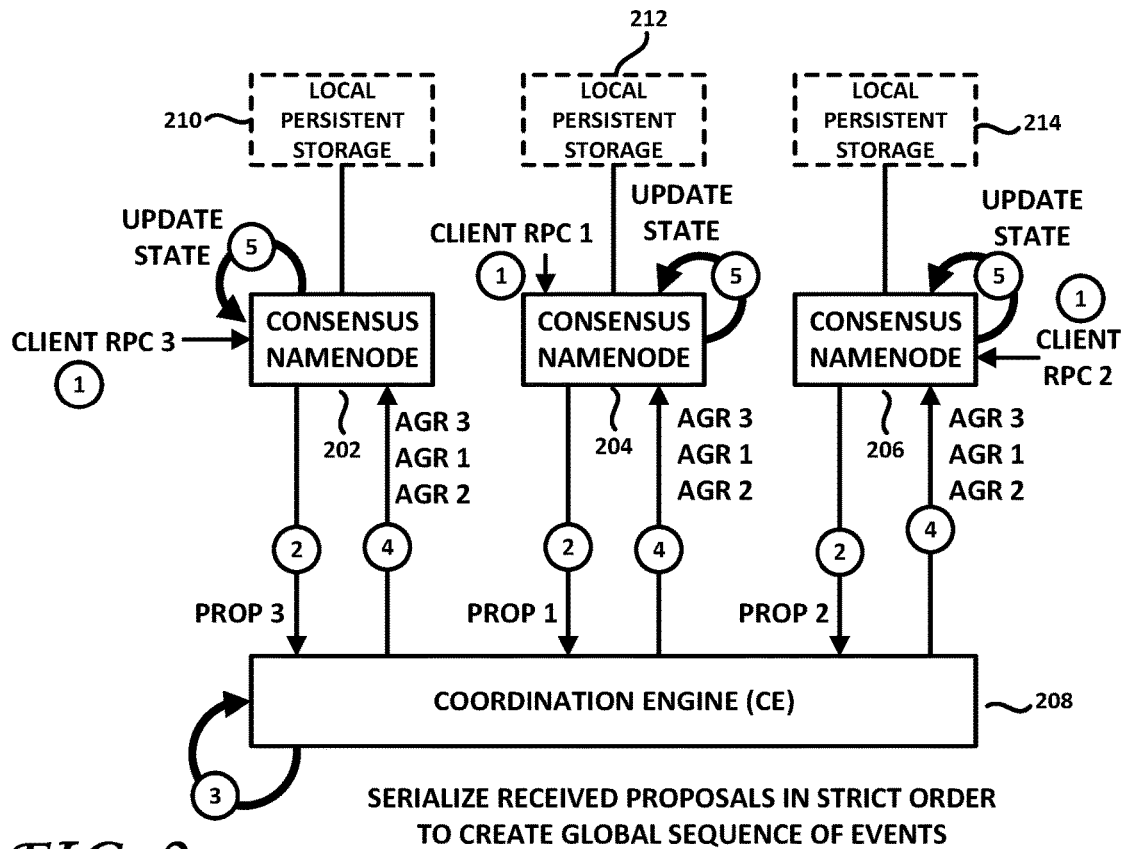
FIG. 2 is a diagram of a distributed file system and aspects of updating Consensus NameNodes according to one embodiment.
Figure 4:
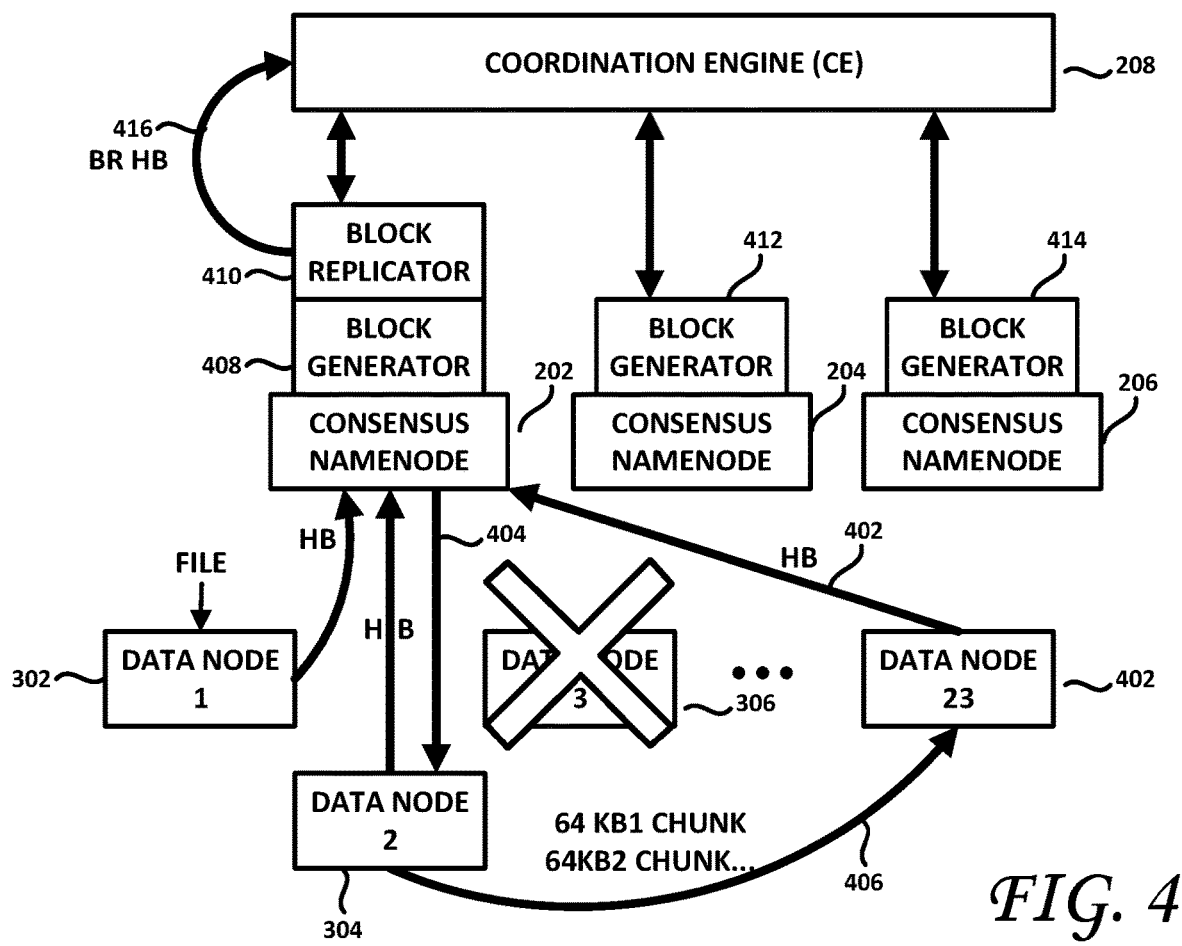
FIG. 4 is a diagram illustrating further aspects of block replication, according to one embodiment.

FIG. 2 is a diagram of a distributed file system and aspects of updating ConsensusNode according to one embodiment that finds particular utility in the LAN environment. According to one embodiment, rather than a single Active NameNode and a Standby NameNode, a cluster may comprise a (preferably odd) plurality (e.g., 3, 5, 7 . . . ) of NameNodes that are coordinated by a Coordination Engine 208. As noted above, herein, a coordinated NameNode is called a ConsensusNode or, hereafter, CNode. As shown in FIG. 2, one embodiment may comprise three CNodes 202, 204, 206, each coupled to the Coordination Engine 208. According to one embodiment, the coordination engine 208 may be configured as an agent at each node, with the agents coordinating with each other over a network. However, for ease of reference and depiction, the Coordination Engine 208 is shown in FIGS. 2 and 4 as being a separate, single entity. According to one embodiment, updates to the namespace, initiated on one instance of the NameNode 202, 204 or 206, are propagated to the other instances in a consistent way by means of the Coordination Engine 208. In this manner, clients access a consistent namespace across all instances of the NameNode. The replication methods disclosed herein provide an active-active model of high availability for a distributed file system such as HDFS, in which metadata requests (read or write) may be load-balanced between multiple instances of the NameNode.

The Coordination Engine 208 may be configured to determine the global order of updates to the namespace. As all instances of the namespace begin in the same state and as all nodes are caused to apply updates in the same deterministic order (but not necessarily, according to embodiments, at the same time), the state of the multiple instances of the namespace will remain consistent (or be brought into consistency) across nodes.

According to one embodiment, and as shown in FIG. 2, consistent updates to the multiple CNode replicas 202, 204, 206 may be carried out as follows. As shown at (1), one of the CNodes (in this case, CNode 202) receives a request to update the namespace from a client. Such a namespace update may comprise a RPC, identified in FIG. 2 as RPC 3. Similarly, in this example, CNode 204 receives RPC 1 and CNode 206 receives RPC 2. The RPCs may comprise a request to add data blocks to a file, create a file or create a directory, for example. According to one embodiment, rather than CNode 202 immediately updating its state with the event (e.g., read, write, delete, etc.) encapsulated within RPC 3, CNode 204 immediately updating its state with the event encapsulated within received RPC 1 and CNode 206 immediately updating its state with the event encapsulated within received RPC 2, and then propagating the updated namespaces to the other ones of the CNodes 202, 204, 206, these separate updates to the namespace replicas at the CNodes are instead passed as proposals to the Coordination Engine 208, which then issues corresponding agreements to the CNodes 202, 204, 206. Indeed, according to one embodiment, the mechanism by which the namespace replicas stored by the CNodes 202, 204, 206 are kept consistent is by issuing proposals to and receiving agreements from the Coordination Engine 208. That is, as shown in FIG. 2, responsive to the receipt of RPC 3, CNode 202 may issue a proposal Prop3 to the Coordination Engine 208 as shown at (2). Similarly, responsive to the receipt of RPC 1, CNode 204 may issue a proposal Prop1 to the Coordination Engine 208 as shown at (2) and responsive to the receipt of RPC 2, CNode 206 may issue a proposal Prop2 to the Coordination Engine 208 as also shown at (2). The Coordination Engine 208, according to one embodiment, then orders the proposals as it receives as shown at (3) and feeds the ordered agreements (in this case, ordered as AGR3, AGR1 and AGR2) back to CNodes 202, 204, 206, as shown at (4). The CNodes 202, 204 and 206, upon receipt of the ordered sequence of agreements AGR3, AGR1 and AGR2, apply these agreements to their respective memory states in that deterministic order, so that the namespace replicas may be maintained consistent across CNodes 202, 204, 206. In this manner, the state of the CNodes 202, 204, 206 may be asynchronously updated, as shown at (5) without loss of consistency. These updates may then (but need not) be saved as journal transactions in respective local persistent storage 210, 212, 214 that may (but need not, as indicated by the dashed lines at 210, 212 and 214) be coupled or accessible to the CNodes 202, 204, 206. Then, notifications may be returned to the clients of CNode 202, 204, 206, informing the clients of the success of the update.

Thus, according to one embodiment, CNodes 202, 204, 206 do not directly apply client requests to their respective states, but rather redirect them as proposals to the Coordination Engine 208 for ordering. Updates to the CNodes are then issued from the Coordination Engine 208 as an ordered set of agreements. This guarantees that every CNode 202, 204, 206 is updated when the client requests changes from one of them, and that the updates will be transparently and consistently applied to all CNodes in the cluster.

For example, if a client creates a directory via CNode 202, and then tries to list the just-created directory via CNode 204, CNode 204 may return a "file not found" exception. Similarly, a client may read different number of bytes of the last data block of a file that is under construction because replicas of the same block on different DataNodes have different lengths while the data is in transition from one DataNode to another, as detailed below relative to FIG. 3. This is known as a "stale read" problem.

Therefore, a significant role of the Coordination Engine 208, according to one embodiment, is to process the namespace state modification proposals from all CNodes and transform them into the global ordered sequence of agreements. The CNodes may then apply the agreements from that ordered sequence as updates to their state. The agreements may, according to one embodiment, be ordered according to a Global Sequence Number (GSN), which may be configured as a unique monotonically increasing number. The GSN may be otherwise configured, as those of skill in this art may recognize. The GSN may then be used to compare the progress of different CNodes in updating the state of the namespace and keeping that namespace state consistent across CNodes. For example, if CNode 202 has just processed an agreement numbered GSN1, which is smaller than GSN2 just processed by CNode 204, then CNode 202 has an earlier namespace state than CNode 204.

According to one embodiment, with each operation, clients learn about the latest GSN processed on the CNode to which the client is currently connected. Thereafter, if the client switches to another CNode it should, according to one embodiment, first wait (if necessary) until the new CNode catches up with the last GSN the client knows about (i.e., the GSN that the client received from the previously-accessed CNode) before issuing an RPC comprising a data access command. This will avoid the stale read problem.

According to one embodiment, only the operations that update the state of the namespace need to be coordinated by the Coordination Engine 208. That is, most (but not all, according to one embodiment detailed below) read requests may be directly served by any of the CNodes to which the client is connected, as read requests do not alter the state of the namespace. It is to be noted that, according to one embodiment, the Coordination Engine 208 does not guarantee that all CNodes 202, 204, 206 have the same state at any given moment. Rather, the Coordination Engine 208 guarantees that every CNode 202, 204, 206 will consistently learn about every update in the same order as all other CNodes, and clients will be able to see this information. In this manner, the Coordination Engine 208 is configured to generate a globally ordered sequence of events that is identically supplied to all CNodes 202, 204, 206.

According to one embodiment, journal updates to the local persistent storage 210, 212, 214 may be carried out. However, the consistency of the CNodes 202, 204, 206 do not depend on such journal updates and each of the persistent storages (if present), according to one embodiment, is local to a CNode and is not shared across CNodes. Similarly, maintaining the consistency of the namespace state across CNodes 202, 204, 206 does not rely upon sharing other resources, such as memory or processor resources.

There is no preferred (master or otherwise distinguished) CNode, according to embodiments. Indeed, should one or more CNode server fail, or is taken offline for maintenance (or for any other reason), other active CNode servers are always available to serve clients without any interruption in access. According to one embodiment, as soon as the server comes back online, it resynchronizes with the other CNode servers automatically, as described below. Such synchronization may comprise learning of all agreements that were issued by the Coordination Engine 208 since the CNode went down or was taken offline. Both the split-brain condition and data loss are eliminated, as all CNodes are active and always maintained in or brought to synchronism, thereby providing continuous hot backup by default. Both failover and recovery are immediate and automatic, which further eliminates need for manual intervention and the risk of administrator error. Moreover, none of the CNodes 202, 204, 206 is configured as passive standby NameNodes. Indeed, according to one embodiment all CNode servers in the cluster are configured to support simultaneous client requests. Consequently, this enables the cluster to be scaled to support additional CNode servers, without sacrificing performance as workload increases. According to one embodiment, there are no passive standby servers and the vulnerabilities and bottleneck of a single active NameNode server are completely eliminated. Moreover, distributing client requests across multiple CNodes 202, 204, 206 inherently distributes the processing load and traffic over all available CNodes. Active load balancing across CNodes 202, 204, 206 may also be carried out, as compared to the Active/Standby NameNode paradigm, in which all client requests are serviced by a single NameNode.

Figure 3:
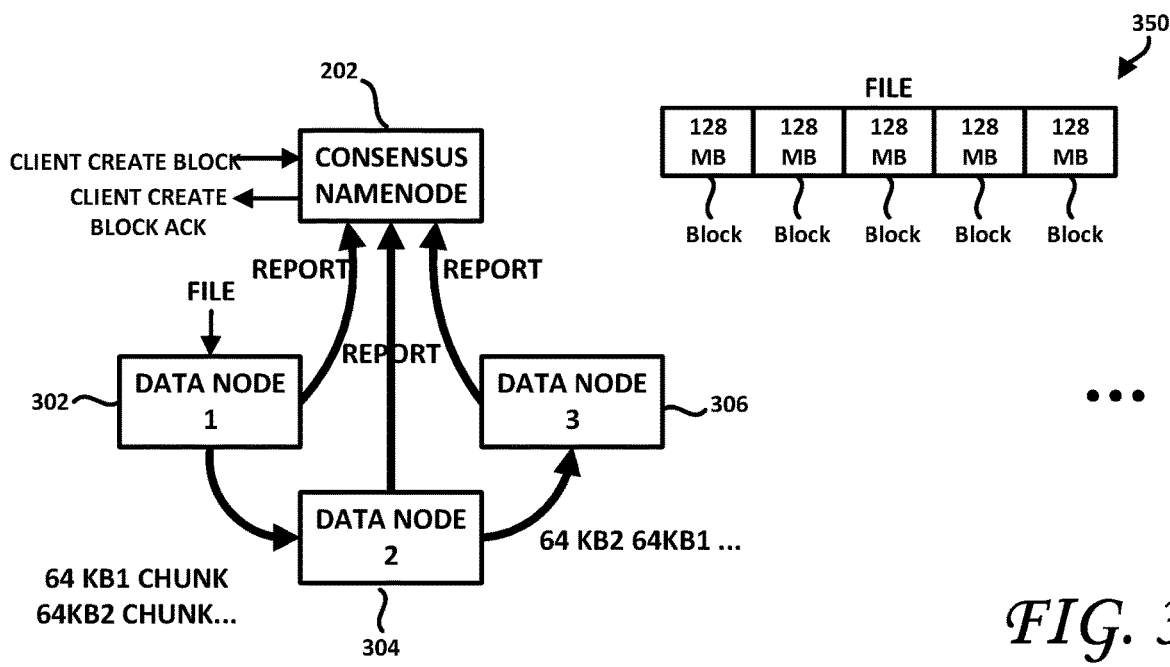
FIG. 3 is a diagram illustrating aspects of a method of block replication and generation in a distributed file system, according to one embodiment.

FIG. 3 is a diagram illustrating aspects of a method of block replication and generation in a distributed file system, according to one embodiment. At 350, FIG. 3 shows a file to be stored in HDFS. According to one embodiment, the unit of storage may be termed a block and the block size may be quite large. For example, the block size may be 128 MB of physical storage. Other block sizes may be readily implemented. File 350 is shown in FIG. 3 as comprising a plurality of 128 MB data blocks. The block size need not be 128 MB. According to one embodiment, each data block of a file may be replicated (i.e., identically stored) on a plurality of DataNodes. Such DataNodes are shown at 302, 304 and 306 and are configured to couple to one or more CNodes, such as CNode 202. According to one embodiment, each DataNode may be configured to communicate with each of the CNodes on the cluster. Data blocks of files may be stored on a greater number of DataNodes, such as on 5 or 7 DataNodes. Storing each data block on multiple DataNodes provides data reliability through redundancy.

As shown in FIG. 2, a client sends a message (e. g., a RPC) to CNode 202, indicating the client's intention to create a file and write a block of data to the file. The CNode 202, according to one embodiment, may then select multiple DataNodes (three in this exemplary implementation) 302, 304 and 306, to which the data block of this newly-created file will be replicated, and so informs the client. The client may then, according to one embodiment, begin streaming (or otherwise sending) data to a selected one of the three DataNodes 302, 304 and 306. Such streaming may be carried out by serially sending to the selected DataNode (DataNode 302, for example) small chunks of each data block. For example, the client may send to the DataNode 302 a serial stream of 64 KB chunks of the first data block of the file, until the first data block of the file has been successfully transmitted to the DataNode 302. Handshaking between the client and the selected DataNode 302 may ensure that each data block is successfully received and stored by the selected DataNode 302. The data chunks sent to the first DataNode 302 may also comprise an indication of the second DataNode 304 to which the data blocks of the client's file are to be sent. According to one embodiment, rather than the client sending the data blocks of the file directly to the three (or more) DataNodes selected by the CNode 202 to receive replicas of the data blocks of the file, the first DataNode 302, having just received a chunk of data of the block, may then itself send the received data chunk to the next (e. g., DataNode 304) of the three DataNodes to receive the data blocks of the file. Similarly, after DataNode 304 has successfully received the data chunk sent to it by DataNode 302, it may then send the data chunk to the last of the three DataNodes selected by the CNode 202 to receive replicas of the constituent data blocks of the client's file. In this manner, a pipeline of data chunks is created, in which a first DataNode selected by the CNode forwards data chunks to the second DataNode selected by the CNode and in which the second DataNode forwards data chunks it has received to the third DataNode selected by the CNode to receive replicas of the data block of the file (and so on, if more than three DataNodes are to receive the block of the file).

According to one embodiment, the CNode does not assume that the DataNodes it has selected as recipients of the constituent data blocks of the client's file have, in fact, successfully received and stored the data blocks. Instead, according to one embodiment, once in possession of one or more data blocks of the client's file, the DataNodes 302, 304, 306 may report back to the CNode 202 that they now store a replica of the data block sent to them either by the client directly or by another DataNodes, as shown in FIG. 3. At least some (and, according to one embodiment, each) of the DataNodes may periodically issue a "heartbeat" message to the CNodes, which heartbeat message may be configured to inform the CNodes that the issuing DataNode is still active and in good health (i.e., able to service data access requests from clients). The DataNodes may, according to one embodiment, report the successful receipt and storage of one or more data blocks of the client's file as another message to the CNode. In the exemplary situation depicted in FIG. 3, DataNodes 302, 304, 306 may report to the CNode 202 that they have successfully received and stored one or more of the data blocks of the client's file to the CNode 202.

DataNodes can fail. Whether that failure is caused by an interruption in the communication channel between the DataNode and the CNode, failure of a file server or failure of the underlying physical storage (or any other failure), such failure means that data blocks may be unavailable, at least from the failed DataNode. In the example shown in FIG. 4, DataNode 306 has failed. According to one embodiment, the CNodes 202, 204, 206 may not be immediately apprised of this changed status of DataNode 306. Instead, the heartbeat message mechanism described above may be used to good advantage to keep the CNodes apprised of the near-current (as of the last heartbeat) status of each of the DataNodes. That is, according to one embodiment, failure of the CNodes to receive a heartbeat message within a predetermined time period is interpreted, by the CNodes, as a failure of the non-heartbeat sending DataNode. That predetermined time period may be set, for example, to a time period that is greater than the expected interval between heartbeat messages from any single DataNode.

In the example of FIG. 4, DataNode 306 has failed to send a heartbeat message ("HB" in FIG. 3) within the predetermined time interval since its last heartbeat and may, therefore, be considered to have failed and that its stored data blocks are, at least for the time being, inaccessible. In turn, this means that only DataNodes 302 and 304 store the data blocks of different files. According to one embodiment, the CNodes may keep a list of DataNodes that are currently active and, according to one embodiment, ready to accept new data blocks and/or service data access requests. Such a list may be termed an "active" list. Upon failure to receive an expected heartbeat message from a DataNode, such as DataNode 306 in FIG. 4, the DataNode may be considered to have failed and the CNodes may remove the failed DataNode from the active list. According to one embodiment, the active list may be that list from which the CNode, having received a request from a client to create a block, may select the (for example) three DataNodes to which the data block of the to-be-created file will be stored. As DataNode 306 has failed, DataNode 306 may be removed from the active list, making that DataNode, for all purposes, effectively non-existent and unavailable, at least from the point of view of the CNodes.

As the data blocks of the client's file are under-replicated (e.g., stored at fewer than the predetermined number of DataNodes) due to the failure of DataNode 306, the CNode 202 may, according to one embodiment, now select a new DataNode to which the data blocks of the client's file may be replicated, to ensure that a full complement of three DataNodes store replicas of the constituent data blocks of the file. According to one embodiment, CNode 202 may consult the active list and select, from the list, a new DataNode to which the data blocks of the client's file will be replicated, to bring the complement of DataNodes storing replicas of the data blocks of the client's file back up to three (or four, five, etc., depending upon the replication factor assigned to the file). In the example shown in FIG. 4, CNode 202 has selected DataNode 402 as that DataNode to which replicas of the data block will also be stored, to cure the under-replication of the data block. According to one embodiment, CNode 202 may also select the DataNode 304 that will send the replica in its possession to the selected DataNode 402. As shown at 406 in FIG. 4, selected DataNode 304 may then begin to stream chunks of data of the block replica or otherwise send the block replica to the newly-selected DataNode 402. As newly-selected DataNode 402 receives the block replica and as it comes time for DataNode 406 to report to the CNodes, it may report that it now stores replicas of the newly-received blocks. The CNodes may change the namespace to reflect this change. According to one embodiment, the receiving DataNode may be selected by the CNode 202 at random. According to other embodiments, such selection may be made according to predetermined selection criteria.

Figure 5:
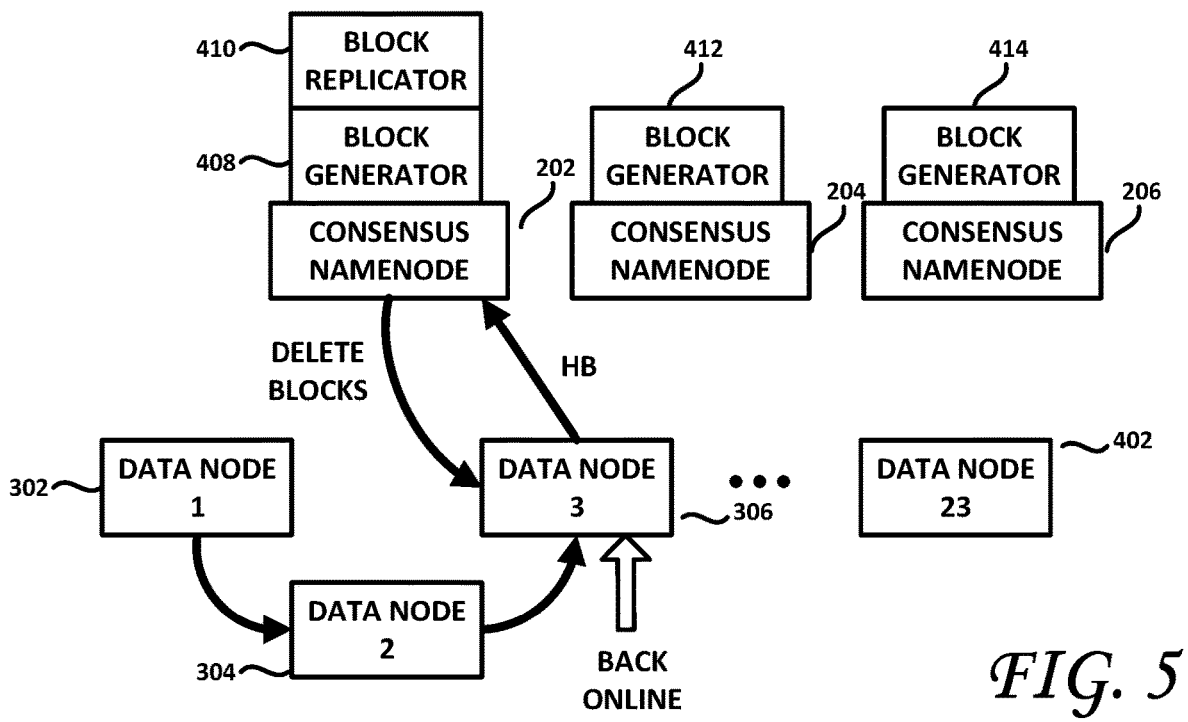
FIG. 5 is a diagram illustrating still further aspects of block replication, according to one embodiment.

According to one embodiment, each of the CNodes 202, 204, 206 is "aware" of each of the DataNodes 302, 304, 306, 402 and all other (potentially thousands) DataNodes whose heartbeats they periodically receive. Upon failure of a DataNode, more than one CNode could decide to select a DataNode as a sending DataNode and another DataNode as the recipient of block replicas, to ensure that blocks are not under-replicated. This could result in multiple CNodes selecting multiple replacement DataNodes to store the data blocks previously stored by a failed DataNode. In turn, such parallel actions may result in blocks being over-replicated (e.g., replicated more than the intended 3, 4, 5 . . . instances thereof). Such over-replication may also occur when, as shown in FIG. 5, a previously failed or otherwise inaccessible DataNode comes back online. In FIG. 5, it is assumed that previously failed or inaccessible DataNode 306 is now once again operational and accessible to the CNodes 202, 204, 206. In this state, blocks of the client's file are now present in four DataNodes; namely, original nodes 302, 304, newly-added DataNode 402 and the no-operational and accessible DataNode 306. The data blocks of the client's file are, therefore, over-replicated. As the back-online status of DataNode 3 is now known to all CNodes 202, 204, 206 (because they each received a heartbeat from revived DataNode 306), it is conceivable that more than one CNode 202, 204, 206 may independently select a DataNode from which to delete block replicas of the client's file. This independent selection may cause the block replicas of the client's file to go from an over-replicated state to an under-replicated state or in the worst case even to be deleted from all DataNodes.

To prevent such occurrences, according to one embodiment, block replication duties may be reserved for a single selected or elected CNode at any given time, the Block Replicator CNode. Such block replication duties, according to one embodiment, may comprise of coordinating block replication (i.e., instructing blocks to be copied between DataNodes) and block deletions. The functionality of block generation, according to one embodiment, does not pose such inherent risks of data loss or over-replication and may, therefore, be vested in each CNode of the cluster. Therefore, all CNodes may be configured to carry out block management duties, according to one embodiment. However, such block management duties may be divided into block replication and deletion duties that are, according to one embodiment, reserved for a single selected CNode, and block generation duties, which may be vested in each of the CNodes of a cluster. This is shown in FIG. 5, in which CNode 202 has been selected as the only CNode configured with a Block Replicator function 410, to enable only CNode 202 to cause data blocks to be copied and/or deleted from DataNodes. In contrast, and as shown in FIG. 5, each of the CNodes 202, 204, 206 may be configured to carry out Block Generator functions 408, 412 and 414, respectively, enabling any of the CNodes 202, 204 and 206 to generate blocks or enable new data blocks to be stored on selected DataNodes reporting thereto.

Each DataNode, according to one embodiment, may be configured to send all communications to all CNodes in the cluster. That is, each active, working DataNode may be configured to send heartbeats, block reports and messages about received or deleted replicas, etc. independently to each CNode of the cluster.

In current implementation of HDFS, DataNodes only recognize a single Active NameNode. In turn, this means that DataNodes will ignore any DataNode command coming from a non-active NameNode. Conventionally, if a non-active NameNode claims it is now the active NameNode, and confirms such status with a higher txId, the DataNode will perform a failover procedure, switching to a new active NameNode and only accepting DataNode commands from the new active NameNode.

To accommodate this method of operation in CNode clusters according to embodiments, only the CNode having block replicator duties (i.e., the current Block Replicator) reports its state as being active to the DataNodes. This guarantees that only the Block Replicator has the ability to command the DataNodes to replicate or delete block replicas.

Applications access HDFS via HDFS clients. Conventionally, an HDFS client would contact the single active NameNode for file metadata and then access data directly from the DataNodes. Indeed, in the current implementation of HDFS, the client always talks to the single active NameNode. If High Availability (HA) is enabled, the active NameNode can failover to a StandByNode. When that occurs, the HDFS client communicates with the newly active NameNode (previously, the StandbyNode) until and if another failover occurs. The failover is handled by a pluggable interface (e.g., FailoverProxyProvider), which can have different implementations.

According to embodiments, however, CNodes are all active at all times and can be equally used to serve namespace information to the clients. According to one embodiment, HDFS clients may be configured to communicate with CNodes via a proxy interface called, for example, the CNodeProxy. According to one embodiment, the CNodeProxy may be configured to randomly select a CNode and to open a communication socket to send the client's RPC requests to this randomly-selected CNode. The client then only sends RPC requests to this CNode until a communication timeout or a failure occurs. The communication timeout may be configurable. When the communication timeout expires, the client may switch to another (e.g., randomly-selected by the CNodeProxy) CNode, open a communication socket to this new CNode and send the client's RPC requests only to this new randomly-selected CNode. For load balancing purposes, for example, this communication timeout may be set to a low value. Indeed, if the CNode to which the client sends its RPC requests is busy, the delay in responding may be greater than the low value of the communication timeout, thereby triggering the client to switch, via the CNodeProxy, the CNode with which it will communicate.

Indeed, random selection of a CNode by HDFS clients enables load balancing of multiple clients communicating with replicated CNodes. Once the CNodeProxy has randomly selected the CNode with which the client will communicate, that client may "stick" to that CNode until, according to one embodiment, the randomly-selected CNode times out or fails. This "stickiness" to the same CNode reduces the chance of stale reads, discussed above, to the case of failover only. The CNodeProxy proxy may be configured to not select CNodes that are in SafeMode, such as may occur when the CNode is restarting and is not fully ready for service yet (e.g., is learning the agreements it may have missed during its down time).

The stale read problem, discussed above, may be further illustrated through an example. For example, if a client creates a directory via CNode1 and then the same or another client tries to list the just-created directory via CNode2, CNode2 may be behind in its learning process and may return file not found exception because it has not yet received or processed the agreement to create the directory.

Similarly, a client may read different number of bytes of the last block of a file that is under construction because replicas of the same block on different DataNodes can have different lengths while the data is in transition.

The stale read problem may manifest itself in two cases:
1. A same client switches over (due to failure, intentional interruption or for load balancing purposes, for example) to a new CNode, which has an older namespace state, and
2. One client modifies namespace, which needs to be seen by other clients.

The first case may be avoided, according to one embodiment, by making the proxy interface CNodeProxy aware of the GSN of the CNode to which it is connected. With each operation, HDFS client learns about the GSN on the CNode. When the client switches to another CNode (e.g., because of failure of the CNode, timeout or a deliberate shut down of that CNode for any reason, the client, through the CNodeProxy, should either choose a CNode with the GSN, which is not lower than it had already seen, or wait until the new CNode catches up with the last GSN the client received from the previous CNode.

The second case arises when a MapReduce job starts. In this case, a MapReduce client places the job configuration files such as job.xml into HDFS, which is then read by all tasks executed on the cluster. If some task connects to a CNode that has not learned about the job configuration files, the task will fail. Conventionally, such constraint requires external coordination between the clients. However, coordination between clients is replaced, according to one embodiment, by coordinated reads.

According to one embodiment, a coordinated read may be performed in the same manner as are modification operations. That is, a CNode submits a proposal to read the file, and actually reads it when the corresponding agreement is received back from the Coordination Engine 208. Thus, read agreements, according to one embodiment, may be executed in the same global sequence as namespace modification agreements, thereby guaranteeing that coordinated reads will never be stale. According to one embodiment, coordinated reads need not be used for all reads, as doing so may unnecessarily increase the computational load on the Coordination Engine 208 and may slow down read performance of the cluster. Accordingly, according to one embodiment, only selected files, such as job.xml, may be exposed to coordinated reads. Therefore, according to one embodiment, a set of file name patterns may be defined, for example, as a configuration parameter. Such patterns may be recognized by the CNodes of a cluster. When such file name patterns are defined, the CNode matches file names to be read against the file name patterns, and if the matching is positive, the CNode performs a coordinated read for that file.

If an object has been accessed once by one client on a particular CNode, it need not be accessed through coordinated reads for subsequent clients. According to one embodiment, a file may be identified as having been accessed through specific RPC calls. In this manner, if a CNode executing such a call sees that the file has not been so identified, that CNode may submit a proposal to the Coordination Engine 208 and wait for the corresponding agreement to be received to perform a coordinated read. This read agreement reaches all CNodes, which may identify their file replicas as having been so accessed. All subsequent client calls to access the identified file, according to one embodiment, not need to be read coordinated. Hence, in the worst case with three CNodes in the cluster, there can be no more than three coordinated reads per file, thereby keeping read performance high.

CNodes can also fail or be brought down intentionally for maintenance. If a failed CNode is also the sole CNode having been invested with block replicator duties (that is, it has been elected as the Block Replicator), then the cluster may be left without the ability to replicate or delete data blocks. According to one embodiment, therefore, the CNode having the Block Replicator function as shown at 410 may be configured to also send periodic block replicator heartbeats (BR HB), as shown at 416, to the Coordination Engine 208. As long as the Coordination Engine 208 receives periodic BR HBs 416 from the CNode selected as include Block Replicator duties 410, that CNode may continue to carry out such block replication duties. However, upon failure of the Coordination Engine 208 to timely receive one or more BR HBs from the CNode selected as the Block Replicator 410, the block replication duties will be assigned to another one of the CNodes within the cluster. In turn, the CNode so selected may then issue periodic BR HBs (that are distinguished from the heartbeats HB issued by the DataNodes) to the Coordination Engine 208 and may continue in that role until the Coordination Engine 208 fails to receive one or more BR HBs, whereupon the CNode selection process may repeat.

According to one embodiment, in order to guarantee the uniqueness of the Block Replicator 410 in the cluster, the CNode comprising the Block Replicator 410 may be configured to periodically submit a BlockReplicatorProposal to the Coordination Engine 208. In turn, the Coordination Engine 208, upon receipt of the BlockReplicatorProposal, may confirm that CNode as having been selected or elected to carry out block replication duties, which confirms its block replicator mission to all CNodes in the cluster. If a BR HB is not heard by CNodes for a configurable period of time, other CNodes, by means of Coordination Engine 208, may begin a process of electing a new Block Replicator CNode.

Indeed, according to one embodiment, a BlockReplicatorProposal is a way for the CNode having block replication duties to confirm its mission as Block Replicator to other CNodes via periodic BR HBs and as a way to conduct an election of a new Block Replicator when BR HB expires. According to one embodiment, a BlockReplicatorProposal may comprise a:
brId—the id of the CNode deemed to be the Block Replicator
brAge—the GSN of the proposing CNode Each CNode may store the latest BlockReplicatorAgreement it has received and the time that agreement was received: <lastBRA, lastRecieved>.

For example, suppose there are three CNodes cn1, cn2, cn3, and cn1 is the current Block Replicator CNode. CNode cn1 periodically proposes BlockReplicatorProposal as a BR HB. This proposal consists of its own node id cn1 and the new age of the Block Replicator, which is equal to the latest GSN observed by cn1 at the time of the proposal. The Coordination Engine 208 receives the BlockReplicatorProposal, generates a corresponding agreement and delivers the agreement to all CNodes cn1, cn2 and cn3. Node cn1, being current Block Replicator, learns the agreement and starts the block replication work. CNodes cn2 and cn3 are not current Block Replicators, as they only remember <lastBRA, lastReceived> and continue regular (non-replication) operations. When lastReceived exceeds a configured threshold, cn2 and/or cn3 may start the election of the new Block Replicator by, according to one embodiment, proposing itself as the candidate.

According to one embodiment, the election process may be initiated by any CNode (or by several of them simultaneously) once the CNode detects that the block replicator heartbeat BR HB has expired. The initiating CNode may, according to one embodiment, start the election process by proposing itself as a new block replicator. The proposal may include the node Id and the latest GSN that the initiating CNode had seen by that time. The proposal may be submitted to the Coordination Engine 208 and when the corresponding agreement reaches the other CNodes, they update their mission with respect to block replicator duty accordingly. That is how the CNode that initiated the election process may become the new block replicator. According to one embodiment, in the case in which several CNodes initiate the election simultaneously, the CNode that proposed the agreement with the highest GSN becomes the block replicator. Thus, the CNode having block replicator duties may change several times during the election process, but in the end there will be only one Block Replicator CNode and all CNodes will agree that CNode has the block replicator duties. According to one embodiment, a failed CNode is guaranteed to never make any block replication or deletion decisions even if it comes back online after failure still assuming it is the Block Replicator. This is because the decision to replicate or to delete blocks is made only as the result of processing a BR HB. That is, after coming back to service, the CNode will wait for the next block replicator heartbeat BR HB to make a replication decision, but the heartbeat agreement will contain information about the new Block Replicator assignment, upon receipt of which the newly-active CNode will know that it no longer has block replication duties.

Figure 6:
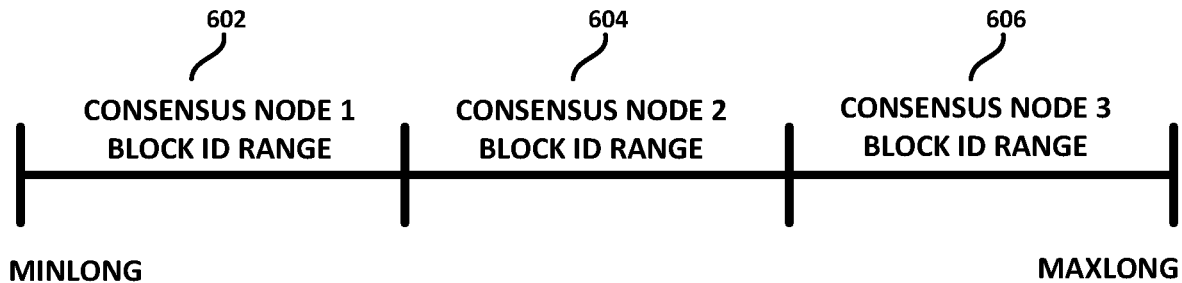
FIG. 6 is a diagram illustrating one manner in which block identifiers may be made to be unique across Consensus NameNodes, according to one embodiment.

That any CNode is enabled to generate or enable the generation of blocks requires that each data block stored in the DataNodes be uniquely identifiable, across the entire cluster. Randomly generating long data block identifiers (IDs) and then checking whether such generated data block ID is truly unique is the current method of generating block IDs in HDFS. This approach is problematic for replicated CNodes since the new block ID must be generated before the proposal to create the block submitted to the Coordination Engine, but by the time the corresponding agreement reaches CNodes, the ID could have already been assigned to another block even though that ID was free at the time it was generated. Coordinating such collisions at the agreement time, although possible, adds unnecessary complexity, traffic and lag time to the process, and delays the eventual acknowledgement of successful data block generation to the client. Instead, according to one embodiment and as shown in FIG. 6, a large range may be defined, ranging from a minimum block ID number (MINLONG) to a maximum block ID number (MAXLONG). This large range may be as large as required to ensure that each data block ID number is unique across the entire cluster and, according to one embodiment, past the anticipated lifetime thereof. For example, the range from MINLONG to MAXLONG may be, for example, a number comprising 1024 bits or more. Thereafter, to ensure that each CNode generates unique data block ID numbers, the MINLONG to MAXLONG range may be logically divided into three CNode block ID ranges, shown in FIG. 6 at ranges 602, 604 and 606. For example, data block ID range 602 may span from MINLONG to MINLONG+X bits, block ID range 604 may span from MINLONG+X to MINLONG+2X, and block ID range 606 may span from MINLONG+2X to MAXLONG.

Sequential Block Id Generator

According to one embodiment, the block ID generation may be sequential. In this case the CNode that originates block allocation, does not need to generate a block ID in advance before the proposal is submitted to the Coordination Engine. Instead, according to one embodiment, CNodes may independently increment their next block ID counters, when the block allocation agreement arrives. This process is deterministic, because all CNodes start from the same value of the counter and apply all agreements in the same order, which guarantees that at any given GSN, the next block ID counter will be the same on all CNodes.

The algorithm addBlock( ) for allocating new block, according to one embodiment, is as follows:
1. ChooseTargets( ) selects potential locations for the block replicas among available live DataNodes according to the replication policy in place.
2. Newly allocated block (locations) with as of yet undefined block ID and generationStamp is submitted as a proposal to the Coordination Engine. When the agreement is reached, each CNode assigns the next block ID and the next generation stamp to the block and then commits it to the namespace.

The locations should still be chosen in advance, as different CNodes cannot deterministically choose the same targets when they independently process the agreement.

Figure 7:
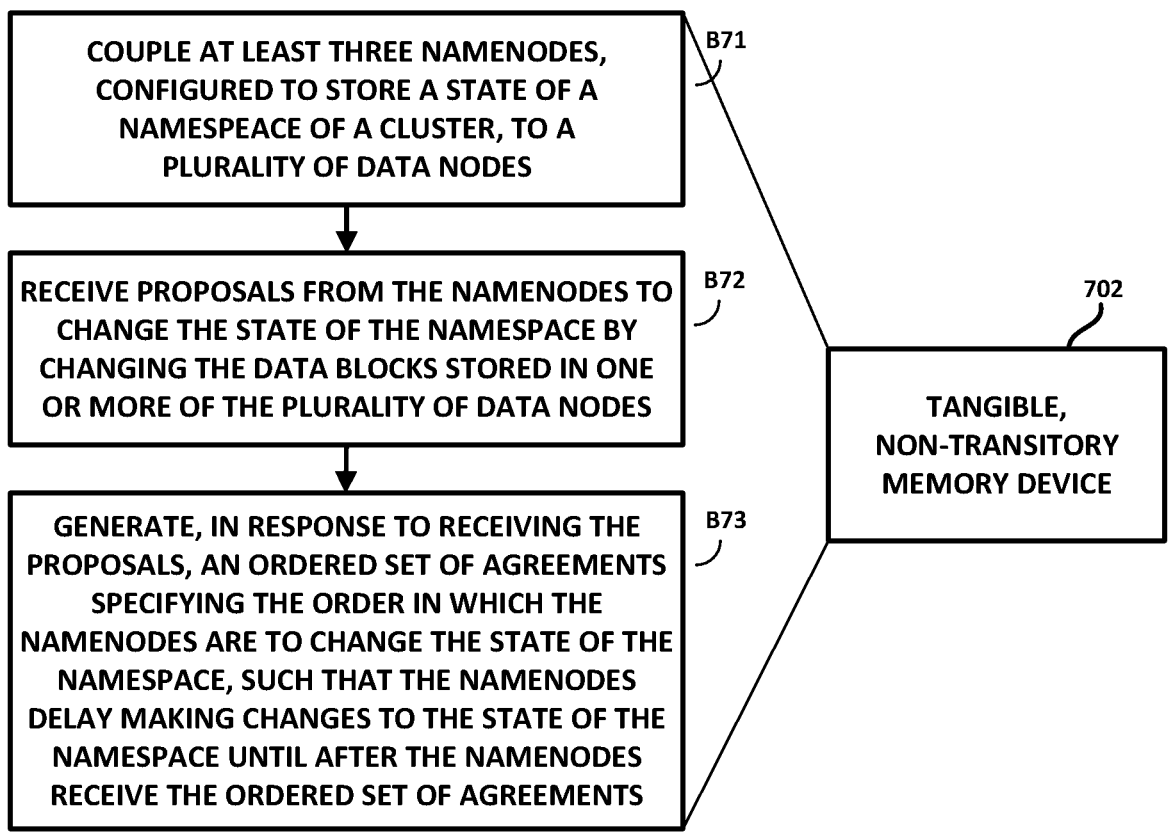
FIG. 7 is a flowchart of a computer-implemented method of implementing a distributed file system comprising a plurality of DataNodes configured to store data blocks of client files, according to one embodiment.

FIG. 7 is a flowchart of a computer-implemented method of implementing a distributed file system comprising a plurality of DataNodes configured to store data blocks of files, according to one embodiment. As shown in Block B71, the method may comprise a step of coupling at least three NameNodes (or some other larger odd number) to a plurality of DataNodes. Each of the NameNodes may be, according to one embodiment, configured to store a state of the namespace of the cluster. As shown in Block B72, a step may then be carried out of (the Coordination Engine 208, for example) receiving proposals from the NameNodes (such as shown at 202, 204, 206 in FIG. 2) to change the state of the namespace by creating or deleting files and directories and adding the data blocks stored in one or more of the plurality of DataNodes (such as shown at 302, 304 and 306 in FIG. 3). Within the present disclosure, "changing", where appropriate, encompasses adding new data blocks, replicating data blocks or deleting data blocks of a client's file. As shown at B73, the computer-implemented method may further comprise generating, in response to receiving the proposals, an ordered set of agreements that specifies the sequence in which the NameNodes are to change the state of the namespace. According to one embodiment, therefore, the NameNodes delay making changes (requested by clients, for example) to the state of the namespace until the NameNodes receive the ordered set of agreements (from the Coordination Engine 208, for example).

According to one embodiment, when a new CNode is to be brought online (such as may be the case in which an existing CNode has failed or is otherwise shut down), the new CNode may be started up in SafeMode, as noted above. The new CNode in SafeMode may then begin receiving registrations and initial data block reports from DataNodes, identifying the data blocks stored in each of the DataNodes to which the new CNode is coupled. According to one embodiment, when a CNode is in SafeMode, it does not accept requests from clients to modify the state of the namespace. That is, before submitting a proposal, the new CNode checks if it is in SafeMode and throws SafeModeException if the new CNode determines that is currently operating in SafeMode. When a sufficient number of block reports are received, according to one embodiment, the new CNode may leave SafeMode and start accepting data modification requests from the clients. On startup, according to one embodiment, CNodes automatically enter SafeMode and then also automatically and asynchronously leave SafeMode once they have received a sufficient number of reports of blocks replicas. The exit from automatic SafeMode, according to one embodiment, is not coordinated through Coordination Engine 208, because CNodes (such as CNodes 202, 204 and 206 in FIG. 2) may process block reports at different rates and, therefore, may reach the threshold at which they may exit SafeMode at different times. In contrast, when a cluster administrator issues a command to enter SafeMode, all CNodes should obey. For this reason, administrator-issued SafeMode commands may be, according to one embodiment, coordinated through the Coordination Engine 208.

As noted above, CNodes can fail or brought down intentionally for maintenance. According to one embodiment, the remaining replicated CNodes will continue operating as long as they form a quorum sufficient for the Coordination Engine 208 to generate agreements. If quorum is lost, according to one embodiment, the cluster will freeze and cease processing requests for changes to the namespace until the quorum is restored.

When a previously-failed CNode or a CNode that was deliberately brought offline comes back online, it will automatically catch up with the other CNodes in its state. According to one embodiment, the Coordination Engine 208 may supply the CNode being brought back online with all the agreements it missed while it was offline. During this period of time, the CNode being brought back online does not have its RPC Server started. Therefore, clients and DataNodes are not able to connect to it (since the RPC is the mode by which they may communicate), which avoids the CNode being brought back up from supplying potentially stale data to the requesting clients. This process happens before the DataNodes connect to the CNode being brought back online. DataNode registrations and initial block reports must be delayed as the reports may contain blocks that the CNode has not learned about yet and which would have been discarded had they been reported.

If the CNode was offline for a long time and missed a significant number of agreements (which may be a configurable threshold), it may be impractical or unfeasible to wait for the CNode to receive the agreements it missed while it was offline and to replay the whole history of missed agreements. In this case and according to one embodiment, it may be more efficient to have the CNode download a checkpoint from one of the active CNodes, load it as the initial namespace state and then receive agreements from the Coordination Engine 208 starting from that checkpoint and then replay the history of the provided agreements from when the checkpoint was made. To do so, the CNode being brought back online may choose one of the active nodes (called the "helper") as a source for retrieving the checkpoint and sends an RPC call (e.g., startCheckpoint( )) to the chosen helper CNode. The helper CNode then issues a StartCheckpoint proposal to the Coordination Engine 208, to ensure that all other CNodes sync up their local checkpoints to the same GSN. When the StartCheckpoint agreement arrives, the helper CNode will remember the GSN of that agreement as a specifically-identified checkpoint that is current up to a specific GSN (e.g., checkpointGSN). This checkpointGSN then determines the agreement after which the emerging CNode will start the learning process once it consumes the checkpoint.

The consumption of the checkpoint by the CNode being brought back online may be performed by uploading the image and the journal files, as is standard for HDFS. After catching up, the CNode may then start receiving block reports from DataNodes. Once SafeMode is off, the newly back online CNode may fully join the cluster and resume its normal duties.

According to one embodiment, the startup of a new CNode or a restart of an existing CNode may comprise the following main stages.

1. The CNode being brought back online starts up and joins the cluster as a Proposer, but with the Learner capabilities muted until stage 3.
   a. It examines its state in the global history relative to other nodes.
2. If its state is substantially behind other nodes—determined by a configurable threshold, then it will download a more recent checkpoint from a selected one of the active helper nodes. The selected helper node also provides the checkpointGSN, which corresponds to the state in history as of the creation of the checkpoint.
3. When the checkpoint is downloaded (if it was necessary) the CNode being brought back online submits its first proposal to the Coordination Engine 208, called AgreementsRecoveryProposal (ARP), and assumes the Learner role.
   a. The CNode being brought back online may start learning the agreements it missed when it was offline, starting from checkpointGSN+1.
4. When CNode being brought back online reaches its own first ARP agreement the catch-up process is considered complete. The newly-brought back online CNode may now assumes the Acceptor role and become a fully functional participant of the cluster and receive further agreements from and submit proposals to the Coordination Engine 208.
5. To do so, the newly brought back online CNode may initialize its RPC server and makes itself available to DataNodes for registrations and block reports. After processing the reports and leaving SafeMode, the CNode may start accepting client requests on an equal basis with the other CNodes of the cluster.

As noted above, each CNode, according to one embodiment, may store an image of the namespace and updates thereto in local persistent (non-volatile) storage that is coupled to the CNode. It is to be noted that the local storage (if present) may be configured such that it is not shared between CNodes. According to one embodiment, each CNode may maintain, in its local persistent storage, its own local image file containing a last namespace image checkpoint and local edits file, which edits file constitutes a journal of transactions applied to the namespace since the last checkpoint. According to one embodiment, shutting down a cluster may bring down CNodes at different moments of namespace evolution. That is, some CNodes may have already applied all transaction specified by the agreements received from the Coordination Engine 208, but some lagging CNodes may not yet have applied all such transactions. Therefore, after a shutdown, edits files on different CNodes may not be equivalent. Therefore, when the cluster restarts, the lagging CNode may start at an older state than is the current state. However, the Coordination Engine 208 may be configured to force the lagging CNode up to the current state by feeding to it missed events from the global sequence.

It is to be noted that this is no different from the nominal cluster operation when some CNodes may fall behind others in updating the state of the namespace through the processing of agreements received from the Coordination Engine 208. Such lagging CNodes may still accept namespace modification requests from clients, and make proposals to the Coordination Engine 208. The resulting proposals will be ordered, placed into the global sequence after the events the CNode has yet to process and will be applied to update the state of the namespace in due order. In this manner, a lagging CNode may be brought "back up to speed" (that is, up to the most current GSN), before new requests are processed, thereby maintaining consistency in the state of the namespace across CNodes of the cluster. According to one embodiment, discrepancies in the persistent state of CNodes during startup may be avoided by performing a "clean" shutdown procedure.

According to one embodiment, a clean shutdown procedure may be provided to force all CNodes to a common state before a cluster is shut down. As the result of carrying out a clean shutdown, all of the local images of the namespace stored in the persistent local memory coupled to each of the CNodes will be identical, and the updates thereto may be represented by an empty sequence of transactions. According to one embodiment, to cleanly shut down and force all local images of the namespace to be identical, each CNode may be commanded to enter the SafeMode of operation, during which time the CNode ceases to process client requests to modify the namespace, while the remaining agreements sent to it by the Coordination Engine 208 are still being processed. Thereafter, an operation may be carried out to save the namespace, thereby creating a local checkpoint of the namespace and emptying the journal. Before killing the CNode processes, it may be ensured that all CNodes have completed their save of the (now identical, across CNodes) namespace and have created their respective local checkpoint of the namespace, to thereby cause all CNodes to restart with the same namespace. Thereafter, the CNode processes may be killed. After a clean shutdown, any subsequent startup process will proceed faster than would otherwise be the case had the CNodes not been shut down cleanly, as none of the CNodes need apply edits and missed updates from the Coordination Engine 208 (as they all were placed in an identical state prior to shutdown).

II Distributed File System on a Wide Area Network (WAN)

Figure 8:
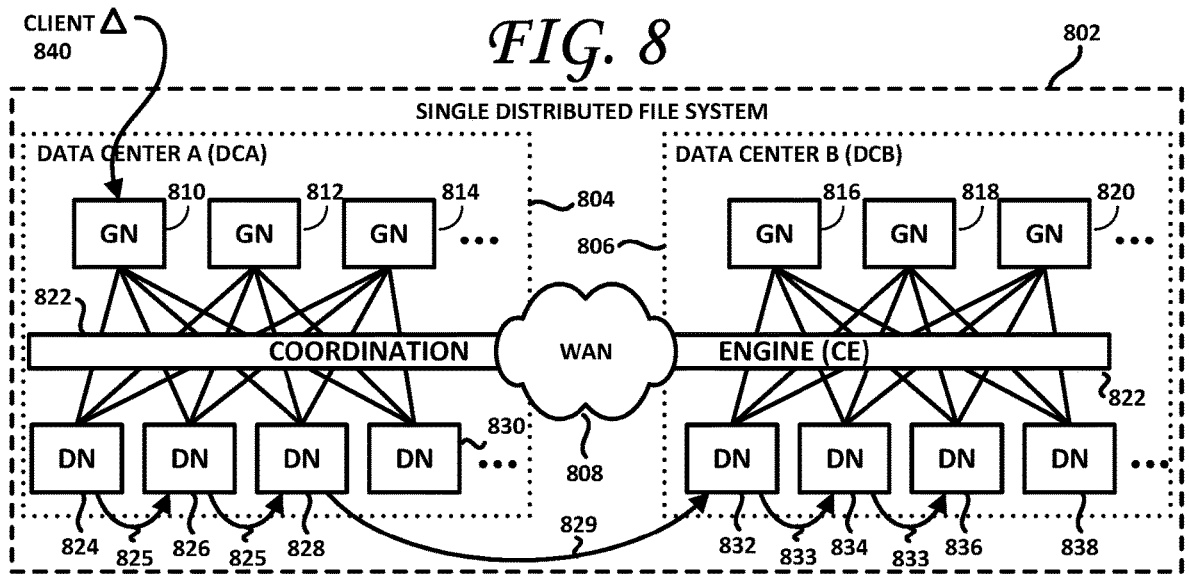
FIG. 8 is a block diagram of components of a distributed file system that spans a WAN, according to one embodiment.

FIG. 8 is a diagram of a distributed file system according to one embodiment that finds particular utility in the WAN environment. FIG. 8 also illustrates aspects of replication methods, applicable over a WAN, for a distributed, NameNode-based file system (such as, for example, HDFS) based on a Replicated State Machine model. According to one embodiment, NameNodes are located in different geographically distributed data centers. Such data centers may be located, for example, on different continents. Herein below, such NameNodes are called GeoNodes, to distinguish them from ConsensusNodes (or CNodes) in the case in which the NameNodes are coupled to one another via a LAN.

According to one embodiment, GeoNodes may be considered to be a special case of the CNodes that are described in detail above. Indeed, GeoNodes may incorporate some or all of the characteristics, concepts, methods and algorithms described herein relative to CNodes that are configured to perform actions across a LAN, such as may be the case in which the CNodes operate within a single data center. Described below are embodiments that are applicable to a distributed file system that spans an HDFS cluster over a WAN that includes, for example, the Internet and/or a private or proprietary WAN.

Architecture Overview

FIG. 8 is a block diagram of components of a cluster and a distributed file system that spans a WAN, according to one embodiment. As shown therein, the (e.g., single) cluster running a distributed file system 802 according to one embodiment, may comprise two or more data centers; namely, Data Center A (DCA) 804 and Data Center B (DCB) 806. DCA 804 and DCB 806 may be geographically remote from one another. For example, DCA 804 and DCB 806 may be located in different parts of a single country, may be distributed on different continents, different time zones and may draw from wholly independent electrical grids. DCA 804 and DCB 806 may be loosely coupled to one another via a WAN 808 that may include, for example, the Internet and/or other private and/or proprietary networks. DCA 804 and DCB 806 may also be coupled via other dedicated, high speed connections. Although only two data centers 804, 806 are shown in FIG. 8, it is to be understood that embodiments may include a greater number of data centers and that the distributed file system 802 extends across all such data centers.

As shown, DCA 804 may comprise a plurality of active (as opposed to, for example, Standby or Failover) NameNodes that, in the present context, are denoted as GeoNodes and referenced in the figures as "GN". In this manner, DCA 804 may comprise GeoNodes denoted by reference numerals 810, 812 and 814 and DCB 806 may comprise GeoNodes denoted by reference numerals 816, 818 and 820. Each of the GeoNodes 810, 812, 814, 816, 818 and 820 may be configured to store the state of the namespace of the distributed file system and to maintain that single namespace in a consistent manner across GeoNodes and data centers. Aspects of the coordination between GeoNodes and the maintenance of the single namespace across GeoNodes may be provided by distributed Coordination Engine (CE) process 822. In FIG. 8, the CE process 822 is shown in a manner that suggests it to be a separate logical entity spanning DCA 804, DCB 806 and the WAN 808. According to one embodiment, however, the functionality of the CE 822, described above and hereunder, may be discharged by each of the GeoNodes 810, 812, 814, 816, 818 and 820. That is, each of the GeoNodes 810, 812, 814, 816, 818 and 820 may be configured, among its other functions, to carry out the duties of the CE 822.

The DCA 802 may comprise a plurality of DataNodes 824, 826, 828, 830, referenced as "DN" in FIG. 8. Similarly, DCB 804 may also comprise a plurality of DataNodes 832, 834, 836, 838, also referenced as "DN" in FIG. 8. As shown, each of the DataNodes 824, 826, 828, 830 may be coupled to and configured to communicate with each of the GeoNodes 810, 812 and 814 of DCA 802. As also shown, each of the DataNodes 832, 834, 836, 838 may be coupled to and configured to communicate with each of the GeoNodes 810, 812 and 814 of DCB 806. According to one embodiment, the GeoNodes do not communicate directly with the DataNodes. Indeed, according to one embodiment, the DataNodes may be configured to send requests to the GeoNodes, whereupon the GeoNodes issue commands to the DataNodes responsive to the received requests. Therefore, although the GeoNodes may be said to control the DataNodes, the DataNodes must, according to one embodiment, send a requests to the GeoNodes in order to receive a command therefrom. Four DataNodes 824, 826, 828, 830 are shown in DCA 804. Similarly, four DataNodes 832, 834, 836 and 838 are shown in DCB 806. It is to be understood, however, that that data centers 804 and 806 may each comprise many more (e.g., thousands) data nodes than are shown in FIG. 8.

Although three GeoNodes 810, 812, 814 are shown as being provided within DCA 802, a greater number of GeoNodes may be provided within DCA 802. Similarly, although three GeoNodes 816, 818, 820 are shown as being provided within DCB 806, a greater number of GeoNodes may be provided within DCB 806. According to one embodiment, the number of GeoNodes within a data center may be selected to be an odd number.

According to one embodiment, FIG. 8 shows a cluster running a single distributed file system spanning different geographically-separated data centers. The distributed file system may, for example, incorporate aspects of HDFS. According to one embodiment, the namespace coordination between GeoNodes within the same data center may be performed using the structures, methods and procedures as described above relative to the LAN use case. For example, each of the DataNodes may be configured to communicate (through DataNode-to-NameNode RPC protocol) only with GeoNodes within their own data center. Conversely, the GeoNodes of a data center may be configured to control only the DataNodes within their own data center. That is, the DataNodes of data center 804 may only, according to one embodiment, communicate with the GeoNodes of their own data center 804 and the Data nodes of data center 806 may only communicate with the GeoNodes of their own data center 806. The GeoNodes of both data centers 802, 804 coordinate with each other to maintain the state of the namespace consistent through the coordination engine process 822. As is described below according to one embodiment, data nodes of one data center may communicate with data nodes of the other data center or data centers.

According to one embodiment, the CE process 822 may be configured to guarantee that the same deterministic updates to the state of the namespace are applied in the same deterministic order on all GeoNodes. The order is defined by Global Sequence Number (GSN). Therefore, a significant role of the CE process 822, according to one embodiment, is to process the proposals to modify or otherwise update the state of the namespace from all GeoNodes and transform them into a global ordered sequence of agreements. The GeoNodes may then apply the agreements from that ordered sequence as updates to their stored state. According to one embodiment, the GSN may be configured as a unique monotonically increasing number. However, the GSN may be otherwise configured, as those of skill in this art may recognize. The GSN may then be used to compare the progress of different GeoNodes in updating the state of the namespace and keeping that namespace state consistent across GeoNodes (or bringing the state of the namespace stored in each of the GeoNodes into consistency over time through the sequential application of the ordered sequence of agreements). For example, if GeoNode 810 has just processed an agreement numbered GSN1, which is smaller than GSN2 just processed by GeoNode 812, then GeoNode 810 has an earlier namespace state than does GeoNode 812. The state of the namespace stored by GeoNode 810 will match that stored by GeoNode 812 as soon as GeoNode 810 processes GSN2, provided that GeoNode 812 has not processed a higher-numbered agreement in the interim. In this manner and through the sequential execution of the ordered set of agreements generated by the CE process 822, the state of the namespace stored in each of the GeoNodes in each of the data centers is brought to or maintained in consistency.

According to one embodiment, with each operation, clients learn about the latest GSN processed on the GeoNode to which the client is currently connected. Thereafter, if the client switches to another GeoNode it should, according to one embodiment, first wait (if necessary) until the new GeoNode catches up with the last GSN the client knows about (i.e., the GSN that the client received from the previously-accessed GeoNode) before issuing an RPC comprising a data access command such as a write. This will avoid the stale read problem. As GeoNodes start from the same state, this ordered application of updates implies consistency of the replicas, in that snapshots thereof taken on different nodes having processed the agreements at the same GSN are identical, both within and across data centers. All metadata between GeoNodes 810, 812, 814, 816, 818, 820 may be coordinated instantaneously as long as the CE process 822 delivers the agreements. Likewise, all file system data is also automatically replicated across the multiple (two shown in FIG. 8) data centers of the cluster.

Herein, the term "foreign" is preferentially used to denote GeoNodes, DataNodes, block replicas, clients, etc. from a different data center. Entities of the same data center are called "native". For example, when a client accesses DCA 804, DCA 804 may be considered to be the local or native data center, whereas DCB 806 may be denoted as the foreign data center. Conversely, should a client access DCB 806, that data center 806 is the local or native data center, whereas DCA 804 is denoted the foreign data center.

According to one embodiment, when a client creates a new file, the CE process 822 ensures that all GeoNodes 810, 812, 814, 816, 818, 820 know about the new file and prevent another file of the same name from being created, even before they have access to the data (e.g., the data blocks) of the new file. According to one embodiment, data blocks are replicated within the native data center and are also replicated between data centers in an asynchronous manner in the background. In this manner, GeoNodes learn about a new file and its data blocks before being able to provide local (relative to the data center) replicas of that block for native clients. That is, a client of DCA 804 may create a new file, which forms the basis of a new ordered proposal submitted to the CE process 822. An ordered agreement is generated and the state of all GeoNodes, both within native DCA 804 and within foreign DCB 806 are updated. Thereafter, as is detailed below, data blocks are transferred to a designated DataNode within DCA 804, and thereafter pipelined (serially, from one DataNode to another DataNode) by the designated DataNode to other (e.g., two other) GeoNode-designated DataNodes within the DCA 804 until a state of full replication is reached. A state of full replication may be reached when, for example, replicas of a data block are stored in three DataNodes of a given data center. The state of full replication may be otherwise defined, as those of skill in this art may recognize. As described below, upon reaching a state of full replication, data blocks may be asynchronously and in the background transferred to DataNodes of one or more remote data centers.

DataNodes 824, 826, 828 and 830 of DCA 804 and DataNodes 832, 834, 836 and 838 of DCB 806 may be configured to store replicas of data blocks of client files. Replicas of any single data block may be stored on the DataNodes of one (e.g., DCA 804), two (e.g., DCA 804 and DCB 806) or on the DataNodes of a greater number of data centers. Since communications over the WAN 808 are resource-intensive and expensive, are prone to variable latencies, interruptions and bandwidth throttling, one embodiment may be configured such that DataNodes of one data center do not communicate to GeoNodes of other (geographically remote, foreign) data centers. That is, as foreshadowed above, DataNodes 824, 826, 828 and 830 only communicate with (e.g., issue requests to) GeoNodes 810, 812, 814 and not with GeoNodes 816, 818, 820 of DCB 806. Conversely, DataNodes 832, 834, 836 and 838 only communicate with GeoNodes 816, 818 and 820 of their own data center and not with foreign (to them) GeoNodes 810, 812 and 814 of DCA 804. This implies that GeoNodes of one data center, according to one embodiment, do not receive block reports or heartbeats directly from DataNodes of foreign data centers and do not send commands to DataNodes of foreign data centers.

According to one embodiment, however, DataNodes of one data center, say DCA 804 may be configured to copy replicas of data blocks over the WAN 808 to one or more foreign data centers, say DCB 806, to provide foreign block replication services. According to one embodiment, network traffic over the WAN 808 may be minimized by sending only one replica of any particular data block over the WAN 808 and configuring any further replication to occur in the foreign DC natively. For example, when a data block is fully replicated in DCA 804, one replica of such data block may be sent over the WAN 808 to DCB 806. Any further replication that may be required to fully replicate that data block in DCB 806 would then occur entirely within DCB 806.

Distributed File System clients such as, for example, HDFS MapReduce tasks may be configured to share the compute environment with DataNodes of the data center of which they are a client. Thus, according to one embodiment, a client may be configured to run in one of the available data centers. Clients tasks may, therefore, be optimized to communicate with GeoNodes that are native to the accessed data center and may be configured to access native DataNodes. However, according to one embodiment, clients may also be configured to reach across the WAN 808 to access data from another data center.

According to embodiments, there are no preferred GeoNodes, in that each is maintained consistent and the system is tolerant of the failure of any one or more GeoNodes or indeed of the failure of one or more data centers. Conversely, according to embodiments, there are no failover, inactive or standby GeoNodes, in that each NameNode in the system is active at all times and maintains a consistent state of the namespace. Further, the systems disclosed herein are configured to appear, act, and be operated as a single distributed file (e.g., HDFS) cluster, as opposed to a multi-cluster architecture in which clusters run independently on each data center while sharing some or all (mirroring) data between them. Like parts of the WAN cluster belonging to different data centers may be configured to have equal roles. In this manner, data may be ingested by or accessed through any of the data centers of the distributed file system. According to embodiments, data creation and access processes may be configured to execute at substantially LAN speeds (i.e., generally faster than WAN speeds in many cases). For example, if a job is run on one of the data centers, that job should complete roughly within the same time period it would have had there been no other date centers.

The structure of the distributed file systems according to embodiments renders it highly failure and disaster tolerant. Indeed, any GeoNode can fail, GeoNodes can fail simultaneously on two or more data centers, an entire data center can fail due to, for example, WAN partitioning, DataNodes can fail (for example, a simultaneous failure of two DataNodes and/or a failure of an entire rack), all while maintaining the functionality of the cluster and free access to data.

Workflow for Creating and Reading Files

Creating a File

Conventionally in HDFS, when a client wants to create a file, it calls NameNode first with a create request followed by addBlock or a functionally similar command. The create call creates an entry in the namespace corresponding to the new file with the specified attributes. The addBlock call allocates a new empty block for the file and assigns prospective DataNode locations for its replicas in accordance with the block replication policy. The client then forms a pipeline from one NameNode-designated DataNode to the next NameNode-designated DataNode and writes data to them. Subsequently, DataNodes report the new block replicas to the NameNode upon receipt.

According to embodiments, however, when the namespace is replicated on multiple GeoNodes (in the WAN case) or CNodes (in the LAN case), the client (reference numeral 840 in FIG. 8) request is sent to and received by one of the multiple GeoNodes or CNodes. In WAN case, according to embodiments, the client may (but need not) select a native GeoNode. The GeoNode having received the client request, acting in this instance as a proposer, then forms a proposal corresponding to the client request and submits the proposal to the CE process 822. Once agreement on this proposal is achieved, the CE process 822 delivers the agreement to all (i.e., to all of the GeoNodes of DCA 804, DCB 806 and all of the GeoNodes of any other data center in the (e.g., HDFS) distributed file cluster. The agreement may then be applied to the local namespace instances of GeoNodes, thus creating the same file or the same block consistently on all GeoNodes. The proposer GeoNode responds to the client after it processes the agreement.

When a block is created, GeoNodes choose native DataNodes as prospective locations for the block. For example, when the client 840 creates a file, an entry in the namespace is created, and through the proposal/agreement process, the state of all GeoNodes, both native and foreign, is updated. In this manner, no other file of that name may be created on any of the data centers. A GeoNode, such as GeoNode 810, then designates prospective DataNodes to store the data block and all replicas thereof. According to one embodiment, the client 840, thereafter, communicates only with the DataNodes and no longer with the GeoNodes. The client 840 may then write data blocks to a GeoNode-designated first prospective DataNode (such as 824, for example) and create a pipeline 825 of replicas from one native DataNode to the next prospective native DataNode in the pipeline, until the full replication (however, "full" replication is defined) is achieved in the native data center. This pipeline may be filled at LAN speeds, since none of the data block replicas are transferred across the WAN 808. Full replication, according to one implementation, may be achieved when replicas of a data block are stored in three separate native DataNodes such as, for example, DataNodes 824, 826 and 828 of DCA 804. To inform all GeoNodes (both native and foreign) of the locations of data blocks, one of the native GeoNodes submits a ForeignReplicaReport proposal via the CE proposal/agreement functionality, after DataNodes report safe receipt of the replicas to that GeoNode.

According to one embodiment, when the GeoNode receives information about all native block replicas, such as when blocks are fully replicated, the GeoNode generates a ForeignReplicaReport proposal to the CE 822. After agreement on this proposal is reached, the ForeignReplicaReport acts to informs all GeoNodes (both native and foreign) of the existence and location of the new replicas. At this stage, both the native and the foreign GeoNodes "know" of the existence of the newly-created file, and of the locations of the block replicas thereof. However, only the GeoNode-designated native DataNodes actually store block replicas thereof. The namespace, therefore, remains updated and consistent across data centers, even if (at this point in time) only the GeoNode-designated native DataNodes store the replicas having given rise to the update to the namespace.

Thereafter, according to one embodiment, a replica transfer is scheduled from one of the new replica-storing native DataNodes to a foreign DataNode, through the standard for HDFS DataTransfer protocol. For example, new replica-storing native DataNode 828 may be scheduled to transfer a block replica across the WAN 808 to a foreign GeoNode-designated prospective DataNode—such as 832. It is to be noted that this transfer may be carried out after the subject replica has been fully replicated (i.e., replicated on 3, 4 or 5 (for example) native DataNodes). From the client's point of view, the writing of data blocks to the GeoNode-designated prospective native DataNodes has been carried out at LAN speeds, which may be comparatively faster than WAN speeds in many cases. At this stage, therefore, the replicas are redundantly stored within the native data center but are not, at this time, also stored in one or more geographically-remote (and thus disaster tolerant) data centers. After one of the new replica-storing native DataNodes transfers a block replica to the foreign GeoNode-designated prospective DataNode, a copy of the block has been asynchronously created on a foreign data center. This transfer necessarily occurs at WAN speeds, but occurs in the background, without delaying the completion and eventual acknowledgment of the client write. According to one embodiment, the newly received replica may then be replicated natively on the foreign data center according to its internal replication policy, via a (e. g, HDFS) replication protocol. For example, the foreign GeoNode-designated foreign DataNode 832 having just received at 829, over the WAN, the copy of the block from a native DataNode such as 828 may then cause that data block to be replicated, in a pipeline fashion (shown at 833 in FIG. 8), to other foreign GeoNode-designated foreign DataNodes such as 834 and 836 until full replication for that block is achieved in the foreign data center and reported to the foreign GeoNodes 816, 818, 820 via the RPC calls from the DataNodes. The foreign GeoNodes may then, again via the proposal/agreement process through the CE 822, update the native GeoNodes at least of the locations, within the foreign DataNodes, of the replicas in the foreign DCB 806.

File Read

When a client of a distributed file system such as HDFS needs to read a file, it sends a getBlockLocations (or functionally-similar) request to the NameNode. The NameNode returns a list of DataNodes that store the replicas of the requested data blocks. The client then reads data from one of the DataNodes closest to the client, with respect to the network topology.

According to one embodiment, on a WAN cluster such as shown at FIG. 8, the client 840 of DCA 804 sends the getBlockLocations (or a functionally-similar) request to one of the native GeoNodes of DCA 804. The native GeoNode to which the client has sent the getBlockLocations requests receives that request and returns to the client 840 a list of locations within the native DataNodes that store replicas of the blocks identified in the request. Such a list may, according to one embodiment, contain only native DataNodes, both native and foreign DataNodes or only foreign DataNodes. Replicas may be stored only on foreign DataNodes in the case in which the blocks are either still being written, still being replicated natively or fully replicated in their native data center but not yet transferred to the foreign (native to the client issuing the read command) data center, as detailed above. If block replicas are stored in DataNodes that are native to the data center from which the getBlockLocations was requested, the client 840 may read block replica from one of the native DataNodes. Otherwise, the client 840 may read the foreign replicas over the WAN 808. However, reads over the WAN 808 are resource-expensive. Thus, for performance reasons, one embodiment enables disallowing foreign replica reads. In that case, the client 840 may be made to wait until replicas of the requested data blocks appear on its native data center and then proceed with reading the now native replicas. The option to allow/disallow foreign reads, according to one embodiment, may be made available as a configuration parameter.

Foreign Block Management

According to one embodiment, a Block Manager maintains information about native file blocks locations and native DataNodes. A Foreign Block Manager may be provided to maintain information about foreign file block locations and foreign DataNodes. The description below details the manner in which embodiments maintain foreign blocks and foreign DataNodes.

Foreign Block Replication

As described above, new blocks of a file may be allocated via an addBlock or functionally-similar call and may be coordinated across GeoNodes. When a GeoNode receives an addBlock request from a client, the addBlock request-receiving GeoNode may choose the required number of native replicas (3 by default in one embodiment) required for full replication and may submit a corresponding AddBlock proposal to the CE process 822. When the corresponding agreement arrives from the CE 822, the GeoNode may deterministically assign a block ID or similar identifier and a generation stamp to the block and may then return LocatedBlock or functionally similar communication to the client. The initial targets for the new blocks of the client's file may be chosen, according to one embodiment, only from the DataNodes that are native to the data center to which the client issued the addBlock request. This allows optimizing write performance, in that clients receive write acknowledgements from the data center to which they are writing without waiting until over-the-WAN transfers are completed. In this manner, clients avoid error processing (such as updatePipeline, for example), as errors are more probable due to the slower or less reliable WAN link 808.

Thus, according to one embodiment, replicas are first stored in DataNodes that are native to the data center of origin via a data pipeline procedure. When the transfer succeeds, the client may safely assume the data is stored in the file system and may then proceed with the next block or other operations. Other (i.e., foreign) data centers, at this juncture, do not own native replicas of the block, although their GeoNodes have been made aware of the existence of the file and may already know the location of the stored block replicas in foreign (to them) datacenters.

According to one embodiment, the GeoNode then waits until the DataNodes in the pipeline report their replicas. When the number of reported replicas reaches full replication (3 by default according to one embodiment) the GeoNode issues a ForeignReplicaReport (FRR) proposal and schedules a transfer of one replica to a foreign data center.

Foreign Replica Report

According to one embodiment, a ForeignReplicaReport (FRR) may be configured to include all native replicas of the block reported to the GeoNode and the name of the data center to which the replicas belong to or the name of the reporting data center. FRRs, according to one embodiment, constitute one possible mechanism by which block replicas existing on one data center may be reported to GeoNodes in other data centers. FRR proposals/agreements may be issued, according to one embodiment, in the following two cases:

1. When the count of native block replicas reaches full replication for the data center, or
2. When the count of native block replicas is reduced to 0 such as may happen, for example, when all (three or however many) of the DataNodes storing the replicas die or are otherwise unavailable to service data access requests.

Upon receipt of a ForeignReplicaReport agreement, a GeoNode may first determine whether foreign replicas are being reported in the FRR. If not, then the FRR is reporting the storage of replicas in native DataNode (of which the GeoNode is already aware) and the GeoNode may safely ignore the FRR. If, however, the replicas that are the subject of the FRR are indeed foreign, the GeoNode may replace its current list of foreign replicas for the reporting data center with the newly reported list. Thus, the FRR mechanism may operate to add and/or remove foreign replicas of the block.

According to one embodiment, each data center may be provided with a (in one embodiment, single) Block Replicator. A single block replicator is shown at 410 in FIG. 4, in the LAN implementation. The Block Replicator makes decisions on replicating and deleting block replicas for the entire cluster in the data center. Such decisions should be made unilaterally, lest too many replicas be created, or worse some blocks may lose all replicas.

According to one embodiment, within a data center, the sole GeoNode assuming the Block Replicator functionality is the GeoNode that issues the FRR. As the purpose of the FRR is to report replica locations within its own data center to other foreign data centers, FRR reports, according to one embodiment, may be configured to only report on the locations of native block replicas.

For performance reasons, the FRR, according to one embodiment, may be issued by the Block Replicator GeoNode, when a block reaches full native replication. In one implementation, a FRR proposal may be issued when the native DataNode report the successful storage of three replicas, although other definitions of "full native replication" may be devised. According to one embodiment, a FRR may not be issued until the number of replicas is reduced to 0, because as long as the data center has at least one replica of the block, that data center can handle replication natively. When, however, the data center no longer has any native replicas of any particular data block or blocks, the Block Replicator GeoNode of the data center may issue a FRR for the block(s) indicating that other data centers should transfer a replica(s) thereto over the WAN 808.

If one or several (but not all) replicas of a data block are lost on DCA 804, other data centers will not know about the less than full replication status of that replica until full replication of the block is restored on DCA 804. At this point (full replication achieved), the Block Replicator GeoNode of DCA 804 will submit a FRR, and other data centers will correspondingly update their foreign replica lists to the actual value as reported by the FRR-is suing DCA 804. In the intervening time period, some foreign reads may fail to read from the missing location(s), but will switch to another replica in a seamless manner.

According to one embodiment, the replication factor (quantifying the number of replicas that should be stored in a given data center for the block to be considered fully replicated) of a given block may be different across data centers. For example, one embodiment allows the cluster to store three replicas in DCA 804 and only one replica of the block in DCB 806, with the block being nevertheless considered to be fully replicated on DCA 804 and on DCB 806. Thus the notion of full replication can be specific for a particular data center. This may be of use, for example, for less than critical data in which a single geographically remote replica is sufficient.

Foreign Replica Transfer

A GeoNode designated as the Block Replicator in a data center may, according to one embodiment, be tasked with the additional responsibility of scanning blocks and detecting those that have native replicas, but do not have foreign ones. This functionality may be assigned to the Block Monitor, which in addition to periodic monitoring of native replicas, also analyses the foreign replication.

When a block with native replicas but no foreign replicas is detected by the GeoNode designated as the Block Replicator, GeoNode selects one of the native DataNodes that stores the replica of interest and directs it to transfer its replica to a DataNode in another data center. The command to transfer the replica across the WAN may be issued via a heartbeat communication between DataNodes and native GeoNodes. Once the command is received, the selected DataNode transfers its replica to the designated foreign DataNode in the foreign data center.

According to embodiments, DataNodes may be configured to accept DataNodeCommands only from the GeoNode designated as having the Block Replicator functionality, which is another reason why each data center may be configured to comprise but a single Block Replicator-designed GeoNode.

Native Block Replicators

In the LAN context, each cluster of CNodes has a unique CNode that is designated as the Block Replicator which is solely tasked with the responsibility to selectively replicate and delete block replicas for the entire cluster. Similarly to CNodes, GeoNodes elect a single Block Replicator GeoNode that is unique to the data center. Each Block Replicator GeoNode sends a Block Replicator heartbeat (BR HB). GeoNodes may be configured to ignore BR HBs from foreign Block Replicators GeoNodes, as such are configured to be used only internally, within each local data center. As described above relative to the LAN Block Replicator CNodes, if the BR HB from the current native Block Replicator GeoNode fails to be issued within the time period allowed therefor, the other GeoNodes within the data center may elect a new Block Replicator GeoNode in a manner that may be similar the method utilized to elect a new Block Replicator CNode.

According to one embodiment, since BR HBs for different data centers are independent of each other, their coordination may be handled either with a single State Machine in which foreign BR HBs are ignored or with multiple State Machines, one independent State Machine for each data center. In the latter case, the state machines may be characterized by disjoint memberships, each including GeoNodes of a single data center.

GeoNodes, in a manner similar to NameNodes and CNodes, may be configured to maintain a list of DataNodes of the cluster along with their respective state (live, dead or decommissioned), as well as their resource utilization such as, for example, the number of data transfers in progress and local disks usage.

Coordinating DataNode Registrations

In a WAN cluster according to embodiments as shown in FIG. 8, DataNodes may be configured, according to one embodiment, to communicate (e.g., issue request) only with native GeoNodes. Particularly, new DataNodes registering on the distributed file system are not configured to send their registration information directly to GeoNodes on foreign data centers. According to one embodiment, a coordinated DataNode registration process may be provided, by which when a DataNode registers with a native GeoNode, that native GeoNode submits DataNodeRegistration proposal to the coordination engine 822 and processes the registration after the corresponding agreement is reached.

When a GeoNode receives this corresponding DataNodeRegistration agreement, it may invoke a registration procedure that may be similar to the procedure performed by a NameNode or a CNode. If the registering DataNode is native, then no further action is needed. For DataNodeRegistration agreements concerning a newly-registering foreign DataNode, the GeoNodes additionally sets the state of the newly-registering foreign DataNode as decommissioned and marks it as foreign, as the GeoNode does not communicate directly with foreign DataNodes. Indeed, according to one embodiment, foreign DataNodes may always be seen by GeoNodes as "decommissioned", as GeoNodes cannot communicate, control, or otherwise collect information directly from foreign DataNodes. In particular, according to embodiments, foreign DataNodes are not used as pipeline targets for blocks. This constraint maintains LAN-like speeds for client data access operations, as the blocks are considered to be fully replicated as soon as a full complement (e.g., 3) of replicas is confirmed in the DataNodes of the local data center. Similarly, foreign DataNodes cannot be declared to be dead based on the local GeoNodes failing to receive their heartbeats within the heartbeat expiration interval because, according to embodiments, DataNodes only communicate with their local GeoNodes and do not issue heartbeats to foreign GeoNodes. This behavior is consistent with that of decommissioned DataNodes on e.g. a HDFS cluster.

Foreign DataNode Descriptor

A registered DataNode, whether foreign or native, may be represented inside a GeoNode by DatanodeDescriptors. A ForeignDatanodeDescriptor is an extension of (regular, local) DatanodeDescriptor, with the following additional fields:

A foreign DataNode marker to distinguish it from native nodes;

The state of the DataNode, as known inside its own (native to it) data center, may be characterized as live, dead, or decommissioned. The state of the DataNode is important for the GeoNode to know when it selects a foreign target DataNode for foreign block replication (not for pipelining replicas), as dead, decommissioned, or decommissioning nodes should not be used as replica targets. Note that this is different from the "decommissioned" status of a newly-registering foreign DataNode with respect to a native GeoNode.

Foreign DataNodes are set with infinite heartbeat expiration interval, as foreign DataNodes are not expected or configured to communicate with (e.g., issue requests to) directly with GeoNodes outside of their own data centers.

According to embodiments, a GeoNode cannot know whether foreign DataNodes are alive or dead as only native GeoNodes can detect when a DataNode stops sending its heartbeats. On a WAN cluster registration, heartbeat expiration, and decommissioning events are coordinated, so that all GeoNodes, both foreign and native, may track the up-to-date state of all DataNodes.

Foreign Block Reports

Block reports are sent by DataNodes in order to inform the NameNode of the block replicas in their possession. For example, when a cluster initially starts up, the local GeoNodes do not know where any of the replicas are stored. It is the block reports that inform the local GeoNodes of the location, within the local DataNodes, of each replica in the cluster. In the LAN context, DataNodes report their blocks to all CNodes.

In the WAN context, however, it may be unacceptably resource-intensive expensive for foreign DataNodes to send entire block reports over the WAN 808 to the GeoNodes of other data centers. Nevertheless, GeoNodes need to know the locations of the replicas stored on foreign DataNodes. Therefore, one embodiment provides for the GeoNodes to write block reports to the distributed file system (e.g., HDFS) itself as a file in a system directory, available to all GeoNodes across data centers. One implementation calls for the block report file path to be formed according to the following naming convention:

/consensus/blockReports/<blockPoolId>/<dcName>/<storageID>/br_<hash-report> where <hash-report> comprises a hash (MD5, for example) of the block report.

According to one embodiment, only non-Block Replicator GeoNodes are configured to write foreign block reports to the file system. Therefore, multiple non-Block Replicator GeoNodes may be so configured and may try to write the same block report. However, only one such non Block Replicator GeoNode should succeed. Adding a (e.g., MD5) hash of the report to the path name makes it possible for GeoNodes to recognize that some other local GeoNode is already writing the block report and may thus avoid writing conflicts. The successful writer will then delete any previous block report files from the directory.

The block-report files are replicated across data centers using a foreign block replication technique. According to one embodiment, GeoNodes may be configured to periodically poll the system directory for new block reports. Once the file is available for reading, GeoNodes of other data centers read it and process the foreign block report. During regular operation, periodic foreign block reports provide GeoNodes with an up-to-date view of where block replicas are located in other data centers on the cluster, in a manner similar to the manner in which DataNodes issue block reports to update the CNodes in the LAN context.

When the whole WAN cluster is starting up, DataNodes of each data center begin generating and sending block reports to their native GeoNodes and GeoNodes start receiving their native block reports. As noted above, according to one embodiment, once a data block reaches full replication in a given data center, a non-Block Replicator GeoNode may issue a FRR proposal to thereby enable foreign GeoNodes obtain information about foreign (to them) block replicas.

In case only one GeoNode restarts on a running WAN cluster, FRRs from another data center are not being sent as the replica count of blocks is not changing. Thus, according to one embodiment, the foreign block report files may constitute the only mechanism by which a restarting GeoNode may learn of the locations at which foreign replicas are stored. It is noted that while the GeoNode is learning the locations of foreign replicas using the FRR process detailed above, GetBlockLocations( ) client requests may fail. According to one embodiment, provisions are made for such client requests to fail-over to GeoNodes on other data centers when foreign locations are still unknown to the GeoNodes of the data center to which the client request was submitted.

GeoNode Startup

According to one embodiment, the GeoNode startup sequence may track that of the CNode in the LAN context, but for a few nuances. In order to convert a single NameNode cluster to a WAN cluster, the storage directory of the NameNode may be distributed to all nodes (e.g., data centers) provisioned to run GeoNodes, and then start the cluster. Alternatively, a single GeoNode may be started where the NameNode was running. Additional GeoNodes may then be added in an empty state such that they form a local LAN cluster, and further GeoNodes may be added on one or more other data centers. According to one embodiment, each GeoNode joining the cluster may then download an image of the namespace from one of the existing nodes and start learning agreements, starting from the GSN of the downloaded checkpoint until it reaches the most current GSN, as detailed above relative to CNodes. If a restarting GeoNode needs to download the image of the namespace, one embodiment calls for the restarting GeoNode to preferentially select one of the other native GeoNodes as a helper if available, which prevents less efficient transfers over the WAN 808.

Foreign State Restoration

Compared to CNodes, GeoNodes at startup may be configured to perform an additional step of populating their foreign state. Such an additional step may comprise adding a final step of adding (learning about) foreign DataNodes and foreign block replicas.

DataNodes, as detailed herein, may be configured to register with a native GeoNode, whereupon that native GeoNode submits DataNodeRegistration proposal to the coordination engine process 822 (which logically spans the entire cluster across data centers) and processes the registration after the corresponding agreement is reached. Thus, when the entire cluster is starting, all GeoNodes learn about foreign DataNodes and foreign block replicas through DataNodeRegistration and ForeignReplicaReport agreements, respectively.

When a cluster is up and a single GeoNode therein is restarting, foreign registrations and foreign replica reports may not be immediately available. As disclosed in detail above, the locations of earlier foreign replicas may be restored from foreign block report files, which may be persistently stored in the distributed file system (e.g., HDFS). However, before these block report files may be read, the GeoNode needs to learn about foreign DataNodes where these replicas are stored.

According to one embodiment, when a GeoNode restarts and/or newly joins the cluster, the GeoNode may issue an AgreementsRecovery proposal before it starts learning missed agreements. This allows the GeoNode to mark the GSN at which the GeoNode can consider itself up-to-date. Indeed, the CE 822 issues an agreement corresponding to the issued proposal, which agreement is incorporated into the global ordered sequence. In this manner, when the GeoNode learns its own AgreementsRecovery agreement along with all the ordered agreements before its own AgreementsRecovery agreement, the "catching up" may be considered to be complete and the state of the stored namespace may be considered to be current and consistent. At this time, the namespace stored in the GeoNode may thereafter stay current through the GeoNode consuming the agreements as they are issued by the CE 822. According to one embodiment, when GeoNodes receive an AgreementsRecovery agreement from a foreign GeoNode, they may additionally mark all their native DataNodes for registration, meaning that the native DataNodes will be asked to re-register on the next heartbeat. This enables the new GeoNode to learn about foreign DataNodes via DataNodeRegistration agreements (which is received by all GeoNodes, across datacenters), which the new GeoNode will receive after its own AgreementsRecovery agreement, when the namespace is up-to-date.

Lease Recovery

Lease Management

A distributed file system (such as, for example, HDFS) may be configured to only allow only one client as the writer to a particular file. In order to enforce single-writer semantics (and to thereby prevent two different clients from opening the same file and beginning to write to it), the concept of leases is introduced. A lease may be created when a file is created or opened for append. The lease identifies the file and the (single) client currently writing to the file. The lease may be destroyed or otherwise marked as expired when the file is closed. An un-expired lease may operate to disallow other clients from having write access to the file for the duration thereof.

According to one embodiment, a LeaseManager process may be configured to maintain leases for a NameNode. If the client to which the lease is assigned dies before closing the file associated with the lease, the lease may be garbage-collected and discarded by the file system itself. Before discarding the lease, the file system may verify if the file is in a consistent state and, if not, may perform a recovery of the file blocks.

According to one embodiment, a lease recovery process may be triggered by a NameNode, when either a hard limit on the file lease expires (such as when the original lease holder becomes silent and no one closes the file for a predetermined period of time), or when a soft limit (e.g., 10 minutes) expires and another client claims write access rights to the file. According to embodiments, the lease recovery process may comprise two steps. Indeed, to start lease recovery, the NameNode may call InternalReleaseLease( ) which may schedule subsequent block replica recovery as needed. Thereafter, to carry out block replica recovery, the NameNode may generate a new generation stamp for the last block of the file, and may select a primary DataNode to sync the block metadata with other replicas using the new generation stamp as the recovery ID. The primary DataNode may then communicate with the other DataNodes to coordinate the right length of the block. For example, the right length of the block may be selected as the smallest length that is common to all DataNodes storing the block or portion of block in question. Once such coordination is complete, the primary DataNode may confirm the results of the recovery to the GeoNode using a CommitBlockSynchronization( ) call. The CommitBlockSynchronization( ) call may be configured to update the last block of the file with the new generation stamp, the new length and the new replica locations. The file may then be closed. The last block may be removed if no data was written thereto by the client before it died.

LAN Leases and CNodes

In the LAN context, any one of the multiple CNodes may trigger a lease recovery when its LeaseManager detects that a lease has expired. However, any changes to the file that was the subject of the lease or its data blocks must be coordinated in order to provide consistent replication on all CNodes.

According to one embodiment, the state of the file may be analyzed in InternalReleaseLease( ) but the CNode does not modify the file, unlike NameNode, at that stage. If the analyzed file is already closed, the CNode simply returns. According to one embodiment, if, however, the file is not already closed, the InternalReleaseLease( ) process issues one of two proposals, depending on the state of the last block of the file:

1) A CompleteProposal may be issued if all blocks of the analyzed file are complete, thereby enabling the CNodes to simply close the file in coordinated fashion;
2) A RecoverBlockProposal may be issued if the blocks of the analyzed file are not complete and block-replica-recovery is needed.

If the recovery is triggered by a soft limit expiration of the lease while processing an agreement (such as append, open, or RecoverLease), the CNode executing such an agreement may then trigger block recovery. According to one embodiment, if the hard limit expires for the lease, then only BlockReplicator will propose Complete or RecoverBlock. In this manner, the chance that multiple CNodes start lease recovery of the same file is minimized. A ShouldReleaseLease( ) procedure may be defined if the CNode can issue the proposals.

When Complete agreement (all concerned DataNodes now store the same blocks of the file) reaches a CNode, the CNode may close the file that was the subject of the lease expiration, thereby completing orderly lease recovery. In the event that Complete proposal is proposed by multiple CNodes, then the first in time Complete agreement may close the file and the subsequent ones need do nothing further.

RecoverBlock agreement, responsive to RecoverBlockProposal, may perform InitializeBlockRecovery( ) which
 1) generates new GSN, which is the unique block recovery ID;
 2) writes a journal record about lease reassignment;
 3) changes the last block state to an UNDER_RECOVERY status, and
 3) adds the block to a to-be-recovered queue.

Even though all CNodes may schedule block-replica-recovery for the last block, only the CNode designated as the sole BlockReplicator will actually ask the primary DataNode to perform the recovery, since only the BlockReplicator CNode can reply to DataNodes with DataNodeCommands.

The CNode designated as BlockReplicator may then schedules block recovery with the primary DataNode. On the final stage of the recovery, the primary DataNode may confirm the recovery results to the BlockReplicator CNode, with a CommitBlockSynchronization( ) call. CommitBlockSynchronization( ) is also coordinated, as it is effective to update or remove the last block and/or close the file, which may include journaling to maintain a persistent record. The BlockReplicator CNode may then submit a CommitBlockSynchronizationProposal and respond to the primary DataNode when the corresponding agreement is reached and executed. The execution of the agreement performs the regular NameNode CommitBlockSynchronization( ) action.

GeoNode: WAN Leases

Recall that GeoNodes, according to one embodiment, cannot recover foreign replicas, as DataNodes report only to native GeoNodes. Blocks are initially created in the data center where the file creation originates. Replicas of the completed blocks of the file being written, according to one embodiment, are transferred to other data centers only upon reaching full replication in the original data center.

In the WAN context, suppose a file was created by a client on datacenter A (DCA) and the client died before closing the file. On data center B (DCB), GeoNodes will have the information about the file and its blocks. DCB can also contain native block replicas of completed blocks of the file (blocks that are fully replicated on DCA). However, DCB should not contain any replicas of blocks that are under construction.

ShouldReleaseLease( ) for WAN will act the same way as for LAN, in both the soft and hard limit expiration cases. That is, lease recovery can be triggered by any GeoNode on any of the data centers. Similarly, Complete agreement may be configured to work in the WAN case as it does in the LAN case and the GeoNode may close the file.

While executing RecoverBlock agreement, each GeoNode checks foreign and native expected locations of the last block of the file. Thereafter, further actions depend upon the state of the blocks of the file that is the subject of the lease:

1. If a block of the file has only foreign locations, then the GeoNode does not InitializeBlockRecovery;
2. If the block has only native locations, then the GeoNode must InitializeBlockRecovery to ensure the recovery is conducted on the data center containing the replicas;
3. If the block has both foreign and native locations, then the GeoNode in the DC that submitted RecoverBlock proposal must InitializeBlockRecovery;
4. If block has no replicas then InitializeBlockRecovery may be scheduled for a random live DataNode. This is performed on the GeoNode belonging to the DC, which submitted RecoverBlock proposal.

Thus, only one BlockReplicator GeoNode on one of the DCs will initialize block recovery. The command to recover replicas will be sent to the primary native DataNode but with all expected locations—foreign and native. The primary DataNode determines the correct length of the block by talking to all DataNodes containing the replicas. This can cause communication between DataNodes on different DCs. After the recovery, the primary DataNode may send a CommitBlockSynchronization call to the BlockReplicator GeoNode, which may then submit a CommitBlockSynchronization proposal.

According to one embodiment, a corresponding CommitBlockSynchronization agreement may contain foreign and native locations as NewTargets for the replicas. Foreign locations are treated by the current GeoNode as ForeignReplicaReport. That is, it stores the newly reported locations as foreign ones, force-completes the last block, and completes the file if requested.

Asymmetric Block Replication

Block replication need not, according to one embodiment, be the same across all data centers in the cluster. Indeed, a per-file selectable replication factor may be provided, which replica factor may be set per file when the file is created. The replication factor may, according to one embodiment, be reset at a later time using a SetReplication( )proposal. Files may be created with a default replication factor. For example, a default replication of 3 may be set. Alternatively, other replication factors may be set such as, for example, 2 or 5. On a WAN cluster, such semantics would ordinarily mean that files would have the same replication factor on different data centers, with the replication factor being equal to the value specified by the creator of the file.

It may be desirable, however, to allow reduced or increased replication on different data centers. For example, when one data center is considered the primary and another data center is considered to be the secondary, one may wish to keep fewer replicas on the secondary data center due to, for example, hardware cost constraints or the desired Quality of Service.

Indeed, a file create call may be modified to allow per data center default replication factors. In this case, a reasonable default behavior may be to set the replication factor to the default value of the current datacenter. For example, suppose that DCA has default replication rA and DCB has its default set to rB. Suppose now that a client located on DCA creates a file with replication factor r. Then DCA will set its replication for the file to r, while DCB will set its replication factor to its default replication rB. According to one embodiment, therefore, a single replication factor parameter in a file create call may be treated as the replication value for the file on the DC of origin, while other DCs use their default replication factors to set the file's replication.

According to one embodiment, the replication factor may be modified by a SetReplication( ) call, which may be configured to allow a single replication value as a parameter. On a WAN cluster, this parameter may be treated as the new replication factor of the file on the datacenter where the client's call was executed. Other data centers may simply ignore the corresponding SetReplication agreement if it was proposed by a foreign GeoNode. Using such a mechanism, the replication factor may be set at will on different data centers. The replication factor may become a data center-specific file attribute and may, therefore, be excluded from one-to-one metadata replication.

Selective Data Replication

Selective data replication, according to one embodiment, enables selected data to be visible only from a designated data center or designated data centers and not allowed to be replicated to or accessed from other data centers. According to embodiments, one or more of the following alternatives may be implemented:
 a directory is replicated to and accessible from all data centers
 a directory is replicated to and readable from all data centers but is writeable only at a given site;
 a directory is replicated on some data centers, but never replicated to another data center;
 a directory is replicated to and is visible only on a single data center.

Recall that in the present replicated architecture, it is assumed that the same single namespace is maintained on multiple nodes. The coordination engine process 822, moreover, guarantees that the replication of metadata and file system data between GeoNodes and across data centers is consistent. Therefore, the term "Selective Data Replication" is applicable to the data stored in the geographically distributed cluster, rather than to the namespace.

In Asymmetric Block Replication introduced above, a data-center specific file attribute was introduced; namely, replication. In this context, the special-case value of 0 plays a significant role in selective data replication. Indeed, if replication factor attribute of a file is set to 0 for data center (DCB), then blocks of that file are never replicated on DCB. Ordinarily, current HDFS clusters do not allow creating files with 0 replication. Embodiments, however, extend SetReplication( ) to allow a 0 value. The SetReplication( ) call, according to one embodiment, changes the replication factor attribute of the file only for current data center. Thus, the value of 0 will disallow the replication of blocks of the file associated with a replication value of zero at that data center.

According to embodiments, SetReplication( ) may be extended to apply to directories as well. If a replication factor attribute is set on a directory, then all files belonging to the sub-tree inherit that replication factor attribute, unless the replication factor attribute is explicitly reset to another value for a particular sub-directory or a particular file. Setting replication factor attributes on directories may be thought as an extension of the default replication parameter, in which a replication factor attribute may be set on the root directory. According to one embodiment, if not explicitly set, the replication factor attribute of a file may be determined by the replication factor attribute of the closest parent that has its replication set.

Selective visibility of files and directories in different data centers may, according to one embodiment, be controlled by permissions, which may be defined as another data center-specific attribute. SetPermissions( ) and SetOwner( ) calls do not propagate their input values to other data centers, similar to SetReplication( ) According to one implementation, setting permission 000 to a directory or a file prohibits access to the respective objects on that data center, effectively making such files "invisible" on the data center. According to one embodiment, the root user (representing the cluster admin) may be provided with the full authority to change owners and permissions.

Roles, Disaster Tolerance in a WAN Cluster

As noted above, CNodes in a distributed coordinated system may assume three main roles: Proposer, Learner, and Acceptor, where each node may assume more than one such role. Often in a LAN cluster, all CNodes assume all three roles. Indeed, in order to keep its state in sync with the CNodes of the LAN, each CNode must be a learner. In order to process client requests, each CNode should also be a proposer. The role of acceptor may be assigned to as many of CNodes as possible in order to maximize the system reliability, that is, resilience to simultaneous node failures. In such an implementation, one or more CNodes may fail without substantively impacting the provided service, as long as the majority of the CNodes are still up and running.

According to one embodiment, a WAN cluster comprising two or more data centers should also provide tolerance to individual GeoNode failures. In addition, it is desired to keep the service up if one of the data centers fails or for any reason becomes isolated from (i.e., inaccessible to) the other(s) data centers. This may occur when, for example, the WAN channel between the data centers is broken. It should be clear that if two data centers become isolated from one another, then both of them should not operate independently, because they could make inconsistent changes to their respective instances of the namespace. However, one of them should remain operable, while the other should be provided with the ability to catch up when communications with the operative data center are restored. According to one embodiment, this may be achieved by running an odd number of GeoNodes, which means that one data center will have more GeoNodes than another.

A different approach can be used when data centers are configured symmetrically. For example, it may be assumed that DCA and DCB run 3 GeoNodes each. GeoNodes from DCA are acceptors with one of the GeoNodes of DCA being designated as a tiebreaker, meaning that three GeoNodes form a quorum if they include the designated tiebreaker GeoNode. In this configuration, DCA can continue operation even in the event that no GeoNodes from DCB are available. In this configuration DCB, being isolated from DCA, will lose quorum and will stall (i.e., not process any further agreements leading to changes in its instance of the namespace) until communication with at least DCA is restored.

Such a configuration can be particularly useful if data centers experience periodic changes in workloads. For example, suppose that DCA has a higher processing load during daytime hours and that DCB has a comparatively higher processing load during the nighttime hours. According to one embodiment, the quorum may be rotated by assigning acceptor roles to GeoNodes of DCA during the day and correspondingly assigning acceptor roles the GeoNodes of DCB during the nighttime hours.

Figure 9:
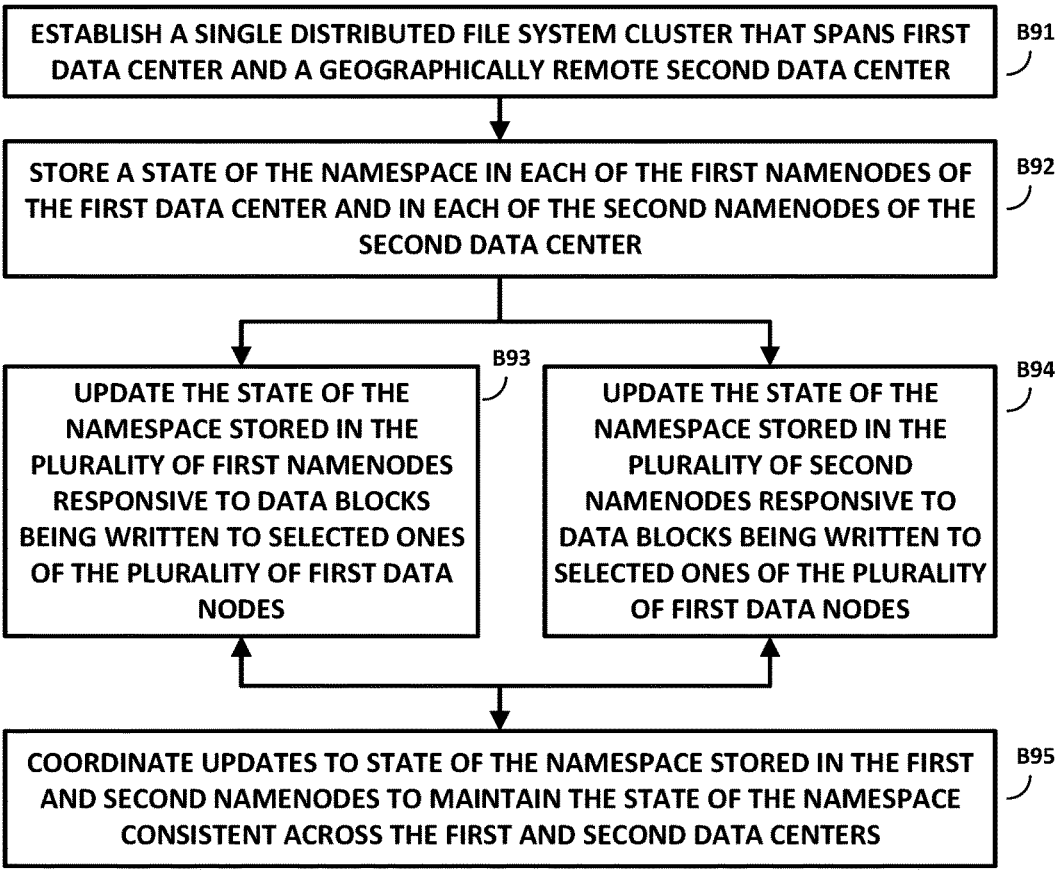
FIG. 9 is a flowchart of a method according to one embodiment.

FIG. 9 is a flowchart of a computer-implemented method according to one embodiment. As shown, block B91 calls for establishing a single distributed file system (computing device) cluster that spans, over a wide area network, a first data center and a geographically remote second data center. In addition, additional data centers (not shown) may be included and administered by the same distributed file system. As shown in FIG. 8, the first data center 804 may comprise a plurality of first NameNodes (also called GeoNodes herein) 810, 812 and 814 (others of the first NameNodes not shown in FIG. 8) and a plurality of first DataNodes (also called DataNodes herein) that are each configured to store data blocks of client files, as shown at 824, 826, 828 and 830 (others of the first DataNodes not shown in FIG. 8). The second data center, as shown in FIG. 8 at 806, may comprise a plurality of second NameNodes 816, 818 and 820 (others of the second NameNodes not shown in FIG. 8) and a plurality of second DataNodes 832, 834, 836 and 838 (others of the second DataNodes not shown in FIG. 8) that are each configured to store data blocks of client files. Block B92 calls for storing, in each of the plurality of first NameNodes and in each of the plurality of second NameNodes, the state of the namespace of the cluster 802. As shown at B93, the state of the namespace stored in first NameNodes may be updated responsive to data blocks being written to one or more selected first DataNodes. Similarly, B94 calls for the state of the namespace stored in second NameNodes may be updated responsive to data blocks being written to one or more selected second DataNodes. Lastly, as shown at B95, updates to the state of the namespace stored in the first NameNodes (810, 812, 814 . . . ) and updates to the state of the namespace stored in the second NameNodes (816, 818, 820 . . . ) may be coordinated (e.g., by coordination engine process 822) to maintain the state of the namespace consistent across the first and second data centers 804, 806 of the single distributed file system cluster. Such updating may be carried out according to the ordered set of agreements disclosed herein. That is, while the state of the namespace stored in a NameNode (whether a CNode or GeoNode) may be different than the state of the namespace stored in another NameNode at any given time, the globally ordered sequence of agreements disclosed herein, as administered by the coordination engine process 822 (which may be configured to run in each of the first and second plurality of NameNodes), ensures that each of the NameNodes, irrespective of the data center within which it is located, will eventually bring its stored state of the namespace into agreement with the state of the namespace stored in other NameNodes through the sequential execution of the ordered set of agreements.

As each of the first NameNodes 810, 812, 814 is an "active" NameNode (as opposed to, for example, a "fallback", "inactive" or "standby" NameNode), one or more of the other first NameNodes 810, 812, 814 may be updating the state of the namespace in the first data center 804 while one or more of the second NameNodes 816, 818, 820 may also be updating the state of the namespace in the second data center 806.

According to further embodiments, each of the plurality of first NameNodes may be configured to update the state of the namespace while one or more others of the first NameNodes in the first data center is also updating the state of the namespace. Each of the plurality of second NameNodes may be configured, according to one embodiment, to update the state of the namespace while one or more others of the second NameNodes in the second data center is also updating the state of the namespace. Each of the plurality of first NameNodes in the first data center may also be configured to update the state of the namespace while any of the plurality of second NameNodes in the second data center is also updating the state of the namespace.

According to further embodiments, each of the first DataNodes may be configured to communicate only with the plurality of first NameNodes in the first data center. Similarly, each of the second DataNodes may be configured to communicate only with the plurality of second NameNodes in the second data center. The coordination engine process may be configured to receive proposals from the first and second plurality of NameNodes to update the state of the namespace and to generate, in response, an ordered set of agreements that specifies the order in which the plurality of first and second plurality of NameNodes are to update the state of the namespace. Indeed, the plurality of first NameNodes and the plurality of second NameNodes may be configured to delay updates to the state of the namespace until the ordered set of agreements is received from the coordination engine process. Moreover, the coordination engine process (822 in FIG. 8) may be configured to maintain the state of the namespace consistent upon a failure of one or more of the first and second NameNodes and/or a failure of one or more of the first and second DataNodes.

For example, the (single, geographically-distributed) file system may be or comprise a version of the Hadoop Distributed File System (HDFS). Other distributed file systems may be devised or adapted according to embodiments, as those of skill may recognize. According to one embodiment, replicas of at least some of the data blocks of a file of a client of the first data center may be stored in selected ones of the plurality of second DataNodes in the second data center and replicas of at least some of the data blocks of a file of a client of the second data center may be stored in selected ones of the plurality of first DataNodes in the first data center.

According to one embodiment, each of the first DataNodes of the first data center may be configured to asynchronously send selected data blocks to a selected one of the plurality of second DataNodes of the second data center over the WAN. The selected data blocks may be sent from the first data center to the second data center after a predetermined number of replicas (e.g., 3) of the selected data blocks are stored on selected ones of the plurality of first DataNodes in the first data center.

According to one embodiment, at least some of the plurality of first NameNodes (according to one embodiment, all but the NameNode assigned BlockReplicator responsibilities) may be configured to generate a foreign block report that includes a list of all data blocks stored in the plurality of first data nodes for consumption by the plurality of second NameNodes. Similarly, at least some of the plurality of second NameNodes (according to one embodiment, all but the NameNode assigned BlockReplicator responsibilities)

may be configured to generate a foreign block report that includes a list of all data blocks stored in the plurality of second DataNodes, for consumption by the plurality of first NameNodes. The generated foreign block report may be written as a block report file to the file system, and each of the first and second NameNodes in the first and second data centers may thereafter periodically read the block report file from the file system and to correspondingly update their respective stored state of the namespace.

The plurality of first NameNodes and the plurality of first DataNodes may be configured to complete writing the data blocks of a client file of the first data center before any of the data blocks of the client file are sent to the second data center over the wide area network. In this manner, client writes are completed at LAN speeds, while replicas of these data blocks may be sent asynchronously to other data centers at WAN speeds. According to one embodiment, the first NameNodes and the first DataNodes may be configured to cause data blocks of a client file to be replicated a first predetermined and selectable number of times within the first data center. Similarly, the second NameNodes and the plurality of second DataNodes may be configured to cause the data blocks of the client file to be replicated a second predetermined and selectable number of times within the second data center. The first predetermined and selectable number of times may be the same as or different from the second predetermined and selectable number of times.

While certain embodiments of the disclosure have been described, these embodiments have been presented by way of example only, and are not intended to limit the scope of the disclosure. Indeed, the novel computer-implemented methods, devices and systems described herein may be embodied in a variety of other forms. For example, one embodiment comprises a tangible, non-transitory machine-readable medium having data stored thereon representing sequences of instructions which, when executed by computing devices, cause the computing devices to implementing a distributed file system over a wide area network as described and shown herein. For example, the sequences of instructions may be downloaded and then stored on a memory device (such as shown at 702 in FIG. 7, for example), storage (fixed or rotating media device or other data carrier, for example). Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of maintaining a state of a single namespace of a distributed file system in a local area network (LAN), the method comprising:
storing the state of the single namespace of the distributed file system in respective local persistent storage coupled to each of a plurality of simultaneously-active peer server node computing devices coupled to the LAN;
receiving, in at least some of the plurality of server node computing devices, at least one request to change the state of the single namespace from at least some of a plurality of data node computing devices coupled to the LAN;
generating, by each of the plurality of simultaneously-active peer server node computing devices having received the at least one request to change the state of the single namespace and for each of the at least one received request, a corresponding proposal to make the change to the state of the single namespace;
sending the generated proposals to a single coordination engine, the single coordination engine being coupled to the LAN and to each of the plurality of server node computing devices;
receiving, by the plurality of simultaneously-active peer server node computing devices and for at least some of the generated proposals, an ordered set of namespace modification agreements sent from the single coordination engine, the ordered set of namespace modification agreements specifying an order in which the plurality simultaneously-active peer server node computing devices are to update the state of the single namespace stored in the respective local persistent storages coupled thereto; and
updating, by the plurality of server node computing devices, the state of the single namespace of the distributed file system stored in the respective local persistent storages, in an order specified by the ordered set of namespace modification agreements received from the single coordination engine, such that the state of the single namespace stored in each of the respective local persistent storages is brought into consistency across the plurality of simultaneously-active peer server node computing devices.

2. The computer-implemented method of claim 1, wherein the single coordination comprises a coordinating engine agent for each of the plurality of server node computing devices.

3. The computer-implemented method of claim 1, wherein updating the state of the single namespace by one of the plurality of simultaneously-active peer server node computing devices is carried out while one or more others of the plurality of simultaneously-active peer server node computing devices is also updating the state of the single namespace.

4. The computer-implemented method of claim 1, wherein the distributed file system comprises a version of the Hadoop Distributed File System (HDFS) and wherein at least some of the plurality of simultaneously-active peer server node computing devices each comprise an HDFS NameNode.

5. The computer-implemented method of claim 1, wherein updating is performed by at least some of the plurality of simultaneously-active peer server node computing devices at different times, but in the order specified by the ordered set of namespace modification agreements received from the single coordination engine.

6. The computer-implemented method of claim 1, wherein not all of the local persistent storages coupled to the plurality of simultaneously-active peer server node computing devices store a same state of the single namespace at a same time.

7. The computer-implemented method of claim 1, wherein the respective local persistent storages coupled to the plurality of simultaneously-active peer server node computing devices are not a shared resource accessible to each of the plurality of server node computing devices.

8. The computer-implemented method of claim 1, wherein the at least one request to change the state of the single namespace comprises a request to one of add, delete or change a data block, file or directory.

9. The computer-implemented method of claim 1, wherein the ordered set of namespace modification agreements sent from the single coordination engine is ordered according to a Global Sequence Number (GSN), configured as a monotonically increasing number.

10. The computer-implemented method of claim 9, further comprising one of the plurality of data node computing devices:
learning of the GSN of a latest namespace modification agreement processed by the server node computing device to which it has been requesting changes to the state of the single namespace;
changing to a selected other one of the plurality of server node computing devices;
waiting until the selected server node computing device has processed a request associated with the learned GSN before requesting the selected server node computing device to change the state of the single namespace; and
submitting a new request to the selected server node computing device to change the state of the single namespace after the selected server node computing device has processed the request associated with the learned GSN.

11. A system of maintaining a state of a single namespace of a distributed file system in a local area network (LAN), the system comprising:
a plurality of simultaneously-active peer server node computing devices coupled to the LAN;
a respective local persistent storage coupled to each of the plurality of server node computing devices, each respective local persistent storage being configured to store the state of the single namespace of the distributed file system;
a plurality of data node computing devices coupled to the LAN, each being configured to request changes to the state of the single namespace from one of the plurality of server node computing devices;
wherein each of the plurality of simultaneously-active peer server node computing devices are configured to, upon receiving requests to change the state of the single namespace from one of the plurality of data node computing devices:
generate, for each received request, a corresponding proposal to make the requested change to the state of the single namespace; and
send the generated proposals to a single coordination engine that is coupled to the LAN and to each of the plurality of server node computing devices;
receive, from the single coordination engine, an ordered set of namespace modification agreements that specifies an order in which the plurality simultaneously-active peer server node computing devices are to update the state of the single namespace stored in the respective local persistent storages coupled thereto; and
update, by the plurality of simultaneously-active peer server node computing devices, the state of the single namespace of the distributed file system stored in the respective local persistent storages, in an order specified by the ordered set of namespace modification agreements received from the single coordination engine, such that the state of the single namespace stored in the respective local persistent storages is brought into consistency across the plurality of simultaneously-active peer server node computing devices.

12. The system of claim 11, wherein the single coordination comprises a coordinating engine agent for each of the plurality of server node computing devices.

13. The system of claim 11, wherein one or more of the plurality of simultaneously-active peer server node computing devices is configured to update the state of the single namespace while one or more others of the plurality of simultaneously-active peer server node computing devices is also updating the state of the single namespace.

14. The system of claim 11, wherein the distributed file system comprises a version of the Hadoop Distributed File System (HDFS) and wherein at least some of the plurality of simultaneously-active peer server node computing devices comprises an HDFS NameNode.

15. The system of claim 11, wherein the plurality of simultaneously-active peer server node computing devices are configured to update the state of the single namespace at different times, but in the order specified by the ordered set of namespace modification agreements received from the single coordination engine.

16. The system of claim 11, wherein not all of the local persistent storages coupled to the plurality of simultaneously-active peer server node computing devices store a same state of the single namespace at a same time.

17. The system of claim 11, wherein the respective local persistent storages coupled to the plurality of simultaneously-active peer server node computing devices are not a shared resource accessible to each of the plurality of server node computing devices.

18. The system of claim 11, wherein each of the requests to change the state of the single namespace comprises a request to one of add, delete or change a data block, file or directory.

19. The system of claim 11, wherein the ordered set of namespace modification agreements sent from the single coordination engine is ordered according to a Global Sequence Number (GSN), configured as a monotonically increasing number.

20. The system of claim 19, wherein one of the plurality of data node computing devices is further configured to:
learn of the GSN of a latest namespace modification agreement processed by the server node computing device to which it has been requesting changes to the state of the single namespace;
change to a selected other one of the plurality of server node computing devices;
wait until the selected server node computing device has processed a request associated with the learned GSN before requesting the selected server node computing device to change the state of the single namespace; and
submit a new request to the selected server node computing device to change the state of the single namespace after the selected server node computing device has processed the request associated with the learned GSN.

\* \* \* \* \*